United States Patent [19]

Kavenik

[11] 4,313,208

[45] Jan. 26, 1982

[54] METHODS AND APPARATUS FOR TRANSMITTING ELECTROMAGNETIC RADIATION FOR ILLUMINATION AND COMMUNICATION

[75] Inventor: Frank E. Kavenik, Mundelein, Ill.

[73] Assignee: Bell & Howell Company, Chicago, Ill.

[21] Appl. No.: 82,850

[22] Filed: Oct. 9, 1979

[51] Int. Cl.$^3$ ........................ H04B 1/10; H04B 15/02

[52] U.S. Cl. ........................................ 455/42; 455/63; 455/66

[58] Field of Search ........................ 455/41, 42, 53, 54, 455/63, 64, 66, 620, 300; 179/1 P

[56] References Cited

U.S. PATENT DOCUMENTS

| | | | |
|---|---|---|---|
| 1,823,794 | 9/1931 | Esau | 455/63 |
| 1,941,424 | 12/1933 | Wells | 455/64 |
| 3,117,278 | 1/1964 | Johnson | 455/42 |
| 3,231,819 | 1/1966 | Aaron | 455/42 |

OTHER PUBLICATIONS

"Practical Radio Communication"-Arthur R. Nilson et al.-1943 pp. 476-478, McGraw-Hill Book Company, Inc.

*Primary Examiner*—Marc E. Bookbinder
*Attorney, Agent, or Firm*—Benoit Law Corporation

[57] ABSTRACT

Methods and apparatus for transmitting electromagnetic radiation in a space for illumination and communication provide in that space a gas discharge lamp, a first antenna for emitting radio frequency signals and a second antenna for receiving such emitted radio frequency signals. The first antenna is located at a distance from the lamp which is larger than the distance between the first and second antennas. The lamp is energized with alternating current for emitting light in the mentioned space. Radio frequency signals are transmitted via the first and second antennas and the mentioned space having the gas discharge lamp provided and energized therein. The gas discharge in the lamp may be confined to a length shorter than one quarter of the shortest wavelength of the transmitted radio frequency signals. The gas discharge lamp may be mounted in a cross-polarized relationship to the first antenna. Additionally or alternatively, the gas discharge lamp may be shielded against radio frequency signals emitted by the first antenna. The gas discharge lamp may be energized by an alternating current having a frequency above the highest useful frequency of a signal modulated on a carrier in the radio frequency signal. The raido frequency signal may be frequency modulated, and may be demodulated by a frequency modulation receiver connected to the second antenna and having an amplitude modulation rejection for suppressing a disturbance caused by the energized gas discharge lamp in the transmitted radio frequency signal.

48 Claims, 13 Drawing Figures

METHODS AND APPARATUS FOR TRANSMITTING ELECTROMAGNETIC RADIATION FOR ILLUMINATION AND COMMUNICATION

BACKGROUND OF THE INVENTION

1. Field of the Invention

The subject invention relates to the fields of radiant energy and electromagnetic radiation and, more specifically, to the transmission of electromagnetic radiation for illumination and communication, to radio, television, telemetry, remote control, intramural information and education systems, passenger entertainment systems abroad aircraft or other vehicles, and other disciplines of utility for the disclosed invention.

2. Disclosure Statement

This disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, an inasmuch as a growing attitude appears to require citation of material which might lead to a discovery of pertinent material.

The spectrum of electromagnetic waves or radiation extends over a vast range of frequencies including such manifestations as light, as well as high-frequency carriers for electric signals. Frequently, electromagnetic radiation is emitted or transmitted in a space for illumination and communication. For instance, a room may be illuminated, while being at the same time traversed by radio waves for telecommunication purposes. In general, electromagnetic radiations of significantly different frequencies do not unfavorably interact with each other in space. However, adverse interactions between methods and apparatus for transmitting electromagnetic radiation of different frequencies occur often and have so far typically been viewed as a species of radio interference.

By way of example, it has been observed that fluorescent or other gas discharge lamps, which emit electromagnetic radiation classified as light, tend to affect adversely radio signal transmissions. Against a background of classification of such disturbances as radio interference, the prior art attempted to attack the problem with electric filtering and conventional shielding techniques. For instance, power line filters were associated with gas discharge lamps in an effort to eliminate such high-frequency disturbances as were believed to having been generated by the gas discharge lamp and proceeding along or radiating from the electric lamp feed lines.

While power line filters are of recognized utility in many applications, they have proved incapable of solving the problem here under consideration, as illustrated by the following example.

Aboard a commercial passenger aircraft, a wireless system was installed for transmitting audio entertainment and sound accompaniment for motion pictures or video programs to passengers accommodated in seats equipped with individual radio receivers.

While entertainment needs of passengers were thus attempted to be met via radio frequency signals transmitted through the passenger section of the aircraft, another form of electromagnetic radiation, namely light, was emitted in the passenger section for illumination purposes as needed. In the interest of economy and efficiency, fluorescent lamps were employed for this purpose. Though the two forms of electromagnetic radiation, namely the radio frequency signals and the light emission did, of course, not as such interfere with each other, given the vast difference in frequency between radio waves and light, a strong interference was nevertheless observed in the form of a disturbing alternating-current hum in the audio signals received and reproduced at various seat locations. Since the mentioned hum had its predominant component at 400 Hz, and since the power supply system of the aircraft provided alternating current at a frequency of 400 Hz, it appeared that the hum in question stemmed in some manner from the aircraft's power supply. After a while, it was observed that the hum disappeared or became negligible when the fluorescent ceiling lights of the aircraft were turned off. The only logical explanation on the basis of existing theory was that the fluorescent fixtures or ballasts in some manner generated a noise signal having a 400 Hz component and finding its way through parts of the power supply system to the wireless entertainment equipment. However, various conventional approaches, including filtering of the fluorescent lamp power supply lines, brought no satisfactory relief, and the entire project was in danger of having to be abandoned.

This would have been very unfortunate, since the currently universally used system for supplying audio information in several channels to seated airline passengers employs a system of wire harnesses extending from a central station in the aircraft to individual program selector and sound transducer units in arm rests of passenger seats. This wire harness system is not only expensive in its implementation and installation, but constitutes a source of increasingly severe trouble to the airline, requiring a disproportionate amount of servicing and trouble-shooting and being particularly vulnerable at the cabin wall/passenger seat interface or cabin floor/passenger seat interface.

Despite these problems, airlines and passengers continue to demand audio distribution systems of the type herein mentioned, not only for the provision of audio entertainment and motion picture or video programm sound accompaniment, but also for the communication of safety instructions, flight information and news items on the ground and in flight as well.

Another example which may be mentioned is the indoor illumination of growing plants with ultraviolet light produced by tubular gas discharge lamps and the simultaneous wireless transmission of signals indicating, for instance, the moisture content or other parameters of the soil in which the plants are grown. In that case, a hum of the above mentioned type could either provoke false readings and control action or necessitate the use of an elaborate filtering or coding system.

Another example stems from the widespread use of neon signs and similar gas discharge structures for the purpose of advertising or designating a product or business. In those instances, interference with radio transmission has been observed, and has falsely been attributed to a type of radio interference traveling along power supply lines.

In the area of communication, wireless telephones are becoming increasinlgy popular. This includes installations in which a telephone connection proceeds from a portion of the subscriber's house to a more remote location of his or her premises. The presence or energized fluorescent or other gas discharge lamps can also entail the above mentioned heretofore unexplained interference.

Given the widespread use of fluorescent lights and other gas discharge lamps and the increasingly frequent utilization of radio and wireless television communications, even on an intramural or relatively short-distance scale, the problem herein illustrated is commensurably widespread and the solutions according to the subject invention and its various aspects are of correspondingly broad utility.

SUMMARY OF THE INVENTION

It is a general object of this invention to overcome the disadvantages and to satisfy the needs expressed or implicit in the above disclosure statement or elsewhere in the specification or drawings hereof.

It is a related object of this invention to provide improved methods and apparatus for transmitting electromagnetic radiation for illumination and communication.

It is a germane object of this invention to prevent radio interference from gas discharge lamps.

It is also an object of this invention to materially reduce interference in various systems employing radio frequency signals for communication, telemetry, remote control and other endeavors.

It is a further object of this invention to promote the comfort and safety of air travel.

It is a germane object of this invention to provide improved methods and apparatus for supplying audio information in several channels via headsets to seated airline passengers.

It is a related object of this invention to provide wireless airline passenger audio entertainment and information systems.

Other objects of this invention will become apparent in the further course of this disclosure.

From one aspect thereof, the subject invention resides in a method of transmitting electromagnetic radiation in a space for illumination and communication. The invention according to this aspect resides, more specifically, in the improvement comprising in combination the steps of providing a gas discharge lamp in said space, providing a first antenna at a first distance from the lamp for emitting radio frequency signals in said space, providing a second antenna at a second distance from the first antenna for receiving the emitted radio frequency signals in said space, making the first distance larger than the second distance, energizing the lamp with alternating current for emitting light in said space, providing radio frequency signals for transmission by the first antenna and reception by the second antenna, and transmitting the radio frequency signals via the first and second antennas and said space having the gas discharge lamp provided and energized therein.

From another aspect thereof, the subject invention resides in a method of transmitting electromagnetic radiation in a space for illumination and communication. The invention according to this aspect resides, more specifically, in the improvement comprising in combination the steps of providing a gas discharge lamp in said space, providing a first antenna at a distance from the lamp for emitting radio frequency signals within a predetermined wavelength range in said space, providing a second antenna at a distance from the first antenna and from the lamp for receiving the emitted radio frequency signals in said space, confining the gas discharge in the lamp to a length shorter than one quarter of the shortest wavelength in said range, energizing the lamp with alternating current for emitting light in said space, providing radio frequency signals within the wavelength range for transmission by the first antenna and reception by said second antenna, and transmitting the radio frequency signals via the first and second antennas and said space having the gas discharge lamp provided and energized therein.

From another aspect thereof, the subject invention resides in a method of transmitting electromagnetic radiation in a space for illumination and communication. The invention according to this aspect resides, more specifically, in the improvement comprising in combination the steps of providing a first antenna for emitting radio frequency signals in said space, providing a second antenna for receiving the emitted radio frequency signals, providing a gas discharge lamp in said space, mounting the gas discharge lamp in a cross-polarized relationship to the first antenna in said space, energizing the lamp with alternating current for emitting light in said space, providing radio frequency signals for transmission by the first antenna and reception by the second antenna, and transmitting the radio frequency signals via the first and second antennas and said space having the gas discharge lamp provided and energized therein.

From another aspect thereof, the subject invention resides in a method of transmitting electromagnetic radiation in a space for illumination and communication. The invention accordong to this aspect resides, more specifically, in the improvement comprising in combination the steps of providing a first antenna for emitting radio frequency signals in said space, providing a second antenna for receiving the emitted radio frequency signals, providing a gas discharge lamp in said space, shielding the gas discharge lamp against the radio frequency signals emitted by the first antenna in said space, energizing the lamp with alternating current for emitting light in said space, providing radio frequency signals for transmission by the first antenna and reception by the second antenna, and transmitting the radio frequency signals via the first and second antennas and said space having the gas discharge lamp provided and energized therein.

From another aspect thereof, the subject invention resides in a method of transmitting electromagnetic radiation in a space for illumination and for communication of a signal having an alternating current component. The invention according to this aspect resides, more specifically in the improvement comprising in combination the steps of modulating the signal on a radio frequency carrier, providing a first antenna for emitting the modulated radio frequency carrier in said space, providing a second antenna for receiving the emitted radio frequency carrier, providing a gas discharge lamp in said space, providing an alternating current having a frequency above the highest useful frequency of the alternating current component, energizing the lamp with the alternating current for emitting light in said space, and transmitting the radio frequency signals via the first and second antennas and the space having the gas discharge lamp provided and energized therein.

From another aspect thereof, the subject invention resides in a method of transmitting electromagnetic radiation in a space for illumination and for communication of a signal. The invention according to this aspect resides, more specifically, in the improvement comprising in combination the steps of modulating the signal on a radio frequency carrier by frequency modulation, providing a first antenna for emitting the modulated radio frequency carrier in said space, providing a second antenna for receiving the emitted radio frequency carrier, providing a gas discharge lamp in said space, energizing the lamp with alternating current for emitting light in said space, whereby an amplitude modulation is imposed on the emitted radio frequency carrier, providing the frequency modulation receiver with an amplitude modulation rejection for said amplitude modulation, connecting the receiver to the second antenna, transmitting the modulated radio frequency carrier via the first and second antennas and said space having the gas discharge lamp provided and energized therein, and receiving and demodulating the transmitted radio frequency carrier with the frequency modulation receiver to regain the signal therefrom, while rejecting the amplitude modulation.

From another aspect thereof, the subject invention resides in apparatus for transmitting electromagnetic radiation in a space for illumination and communication. The invention according to this aspect resides, more specifically, in the improvement comprising, in combination, a gas discharge lamp in said space, means including a first antenna located at a first distance from the lamp for emitting radio frequency signals in said space, means including a second antenna located at a second distance from the first antenna for receiving the emitted radio frequency signals in said space, the first distance being larger than the second distance, means connected to the lamp for energizing the lamp with alternating current for emitting light in said space, and means connected to the first antenna for providing radio frequency signals and for transmitting the radio frequency signals via the first and second antennas and the space having the gas discharge lamp provided and energized therein.

From another aspect thereof, the subject invention resides in apparatus for transmitting electromagnetic radiation in a space for illumination and communication. The invention according to this aspect resides, more specifically, in the improvement comprising, in combination, means including a first antenna for emitting radio frequency signals within a predetermined wavelength range in said space, means including a second antenna at a distance from the first antenna for receiving the emitted radio frequency signals in said space, a gas discharge lamp in said space having gas discharge path of a length shorter than one quarter of the shortest wavelength in the range, means connected to the gas discharge lamp for energizing the lamp with alternating current for emitting light in said space, means for providing radio frequency signals within the wavelength range for transmission by the first antenna and reception by the second antenna, and means connected to the signal providing means and to the first antenna for transmitting the radio frequency signals via the first and second antennas and said space having the gas discharge lamp provided and energized therein.

From another aspect thereof, the subject invention resides in apparatus for transmitting electromagnetic radiation in a space for illumination and communication. The invention according to this aspect resides, more specifically, in the improvement comprising, in combination, means including a first antenna for emitting radio frequency signals in said space, means including a second antenna for receiving the emitted radio frequency signals, a gas discharge lamp, means for mounting the gas discharge lamp in a cross-polarized relationship to the first antenna in said space, means connected to the gas discharge lamp for energizing the lamp with alternating current for emitting light in said space, and means connected to the first antenna for providing radio frequency signals and for transmitting the radio frequency signals via the first and second antennas and said space having the gas discharge lamp provided and energized therein.

From another aspect thereof, the subject invention resides in apparatus for transmitting electromagnetic radiation in a space for illumination and communication. The invention according to this aspect resides, more specifically, in the improvement comprising, in combination, means including a first antenna for emitting radio frequency signals in said space, means including a second antenna for receiving the emitted radio frequency signals, a gas discharge lamp in said space, means for shielding the gas discharge lamp against the radio frequency signals emitted by the first antenna in said space, means connected to the lamp for energizing the lamp with alternating current for emitting light in said space, and means connected to the first antenna for providing radio frequency signals and for transmitting the radio frequency signals via the first and second antennas and the space having the gas discharge lamp provided and energized therein.

From another apsect thereof, the subject invention resides in apparatus for transmitting electromagnetic radiation in a space for illumination and for communication of a signal having an alternating current component. The invention according to this aspect resides, more specifically, in the improvement comprising in combination, means for modulating the signal on a radio frequency carrier, means including a first antenna for emitting the modulated radio frequency carrier in said space, means including a second antenna for receiving the emitted radio frequency carrier, a gas discharge lamp in said space, means for providing an alternating current having a frequency above the highest useful frequency of the alternating current component and for energizing the lamp with the alternating current for emitting light in said space, and means connected to the modulating means and to the first antenna for transmitting the radio frequency signals via the first and second antennas and said space having the gas discharge lamp provided and energized therein.

From another aspect thereof, the subject invention resides in apparatus for transmitting electromagnetic radiation in a space for illumination and for communication of a signal. The invention according to this aspect resides, more specifically, in the improvement comprising, in combination, means for modulating the signal on a radio frequency carrier by frequency modulation, means including a first antenna for emitting the modulated radio frequency carrier in said space, means including a second antenna for receiving the emitted radio frequency carrier, a gas discharge lamp in said space, means connected to the lamp for energizing the lamp with alternating current for emitting light in said space, whereby an amplitude modulation is imposed on the emitted radio frequency carrier, means connected to the modulating means and to the first antenna for transmitting the modulated radio frequency carrier via the first and second antennas and said space having the gas discharge lamp provided and energized therein, and means connected to the second antenna including a frequency modulation receiver for receiving and demodulating the transmitted radio frequency carrier to regain the signal therefrom, the frequency modulation receiver including amplitude modulation rejection means for rejecting said amplitude modulation.

BRIEF DESCRIPTION OF THE DRAWINGS

The subject invention and its various aspects and objects will become more readily apparent from the following description of preferred embodiments thereof, illustrated by way of example in the accompanying drawings, in which like reference numerals designate like or functionally equivalent parts, and in which.

DESCRIPTION OF PREFERRED EMBODIMENTS

Though the subject invention and its principles and manifestations are of widespread utility as mentioned above, its presently most preferred application will be employed in the accompanying drawings and in most of the following text in order to explain its preferred embodiments in greater detail.

Figure 1:
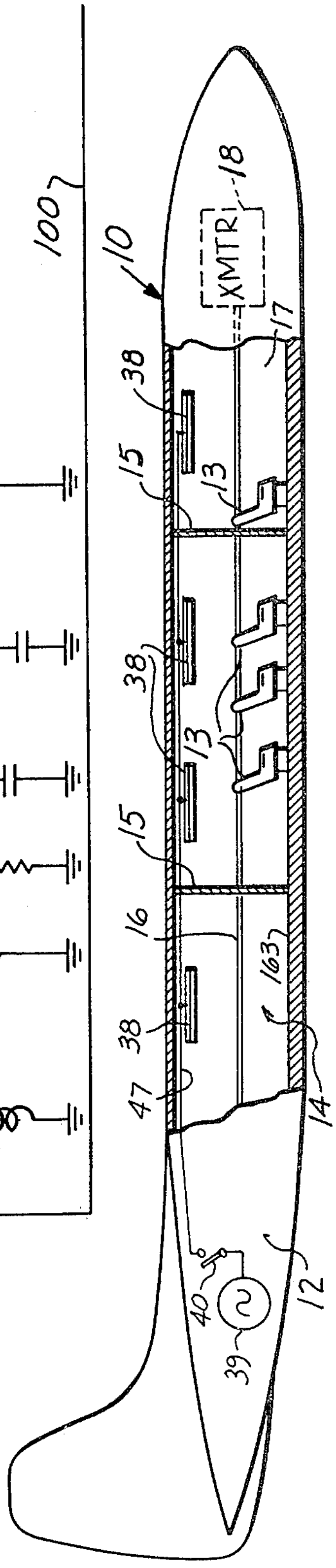
FIG. 1 is a diagrammatic side view, partially in section, of an aircraft and essential parts of a wireless passenger audio entertainment and information system according to a preferred embodiment of the subject invention.
Figure 2:
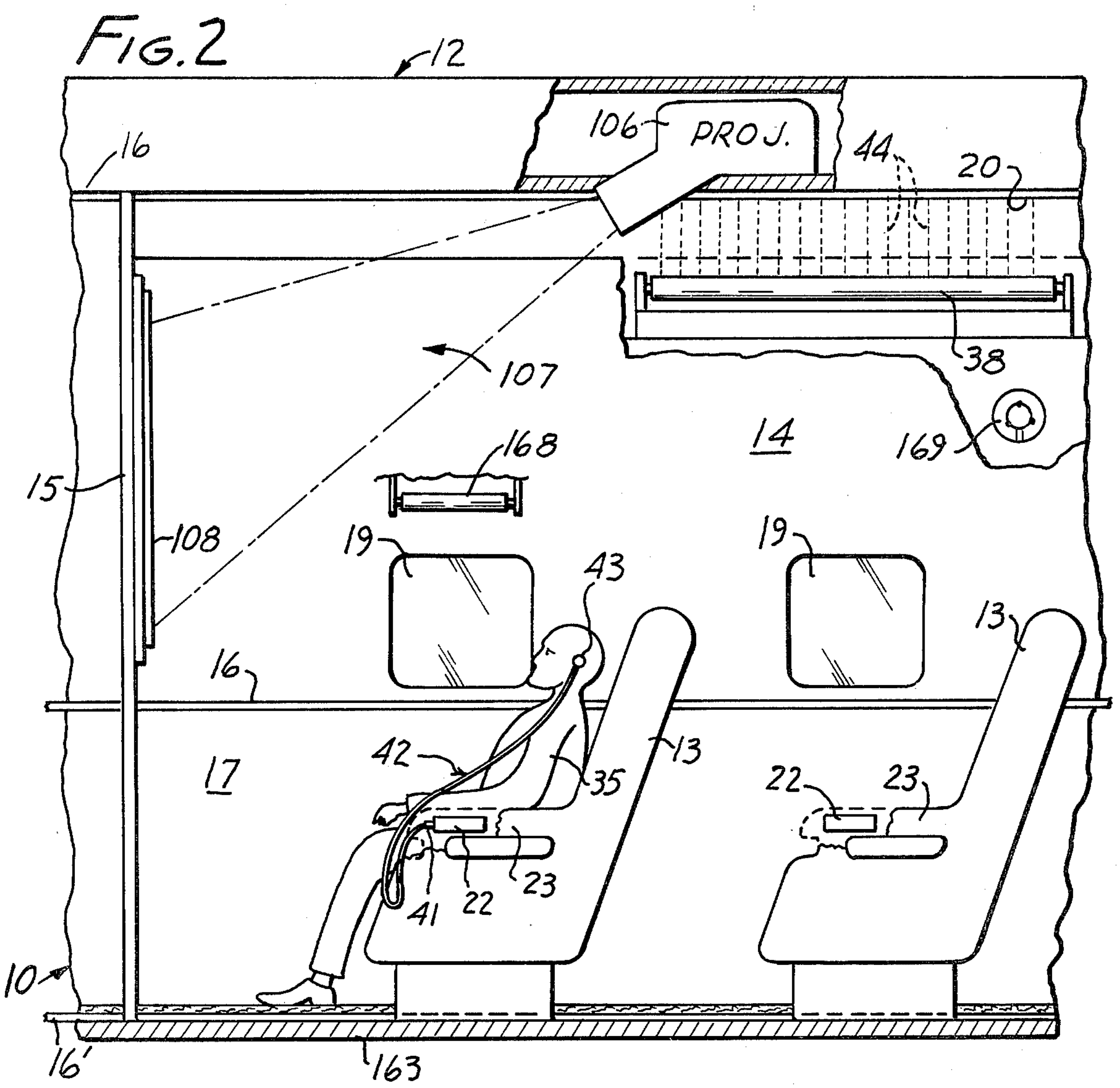
FIG. 2 is a showing on an enlarged scale of a detail of FIG. 1, together with an illustration of additional features.

In this respect, and by way of background, FIG. 1 shows essential parts of an airliner 10 having a metallic fuselage 12 partially in section. In accordance with standard practice, passengers are seated aboard the aircraft in rows in seats 13. For the sake of simplicity only some of these seats are shown in FIGS. 1 and 2. In reality, and in accordance with standard practice, the seats 13 are, however, distributed along an elongate passenger section 14, extending according to FIG. 1 inside the metallic fuselage 12 from the cockpit, toilet and service area at the front of the plane to the service, storage and toilet region at the tail end thereof. Also in accordance with standard practice, the passenger section is subdivided into classes or other passenger compartments by class dividers or bulkheads 15. In larger planes, storage and toilet facilities may, for instance, also be located at the bulkheads 15.

According to the subject invention a first antenna or antenna system 16 is provided for emitting radio frequency signals in a space 17 including the elongate passenger section 14. By way of example, the antenna 16 may be composed of a twin lead, such as a 300Ω television twin cable having a 300Ω termination at one end thereof and being fed from a transmitter 18 at the other.

Dual twin leads may be employed if desired or necessary. Also, the antenna system 16 may be centerfed, such as by a transmitter located approximately amidship the aircraft.

Further variations within the scope of the subject invention include other forms of radiant distributed antennas or antenna systems, a so-called "Radiax" antenna or antenna system in the form of one or more "leaky coax" cables (coaxial cable with distributed holes in its outer shield or conductor), or then an antenna system composed of discrete dipoles or other resonant antenna structures.

The system according to the subject invention includes a transmitter 18 for providing audio information in radio frequency channels in a frequency band which is preferably below 100 MHz. Practical tests have confirmed that the use of such a frequency band permits an entire aircraft of the size of a Boeing 727 to be covered with radio-transmitted audio information and entertainment programs at all seats throughout the entire length of the plane's passenger section at an unprecendentedly low power input to the antenna not in excess of 10 mW per channel. This minimizes or practically avoids interference with the plane's navigational system. Also, tests have confirmed that a preferred transmission frequency band between 72 to 73 MHz avoids radiation and loss of significant amounts of radio frequency energy through the types and sizes of windows customarily employed in commercial aircraft. In other words, the metallic fuselage 12 even though penetrated by a multitude of airplane windows 19, has been found an effective shield against an escape of any significant energy from the antenna 16 and passenger section 14 beyond the confines of the airplane 10.

This is believed to be a remarkable feature, in the light of the fact that the transmitting antenna 16 runs along the entire length of the passenger section 14 or is at least distributed over the passenger compartments.

As a further advantage, the mentioned preferred frequency band between 72 and 73 MHz can neither interfere with public broadcasts, of which television channel 4 is closest with a frequency band between 66 and 72 MHz, nor with radio astronomy located in a band of from 73 to 74.6 MHz, below the aeronautical marker beacon frequency of 75 MHz. Also, the band of 72 to 73 MHz is currently used in the United States by low-power communication devices used for auditory training systems and licensed operational fixed stations.

In practice, each audio channel may be located in a different radio frequency channel within the employed very high frequency [VHF] band. This may, for instance, be accomplished by multiplexing the audio channels onto a single radio frequency carrier modulated thereby. Alternatively, each audio channel may be modulated on a different radio frequency channel. In either case, the same transmitting antenna or antenna system 16 is employed for all channels.

For the reception of the transmitted radio frequency channels, individual antennas are provided for the seats 13. For instance, a separate receiving antenna may be provided for each seat 13 seating a passenger to be equipped with a headset for audio information and entertainment listening.

In this respect, traditional radio engineering judgment would advise against a combination of the receiving antenna with the passenger control unit 22 in the seat armrest 23. Rather, the obvious goal of conventional radio engineering would be to locate the receiving antenna at a location which is less obstructed by the body of the seated passenger and less shielded by unavoidable metallic structure than the armrest region. Also, conventional radio engineering would strive for a half or quarter-wavelength dipole antenna for optimum reception of the transmitted radio frequency channel. The lack of feasibility of such conventional approaches in terms of safety requirements, maintenance operations and cleaning procedures pertaining to airline passenger seats, and in terms of containment and avoidance of uneven distribution of the transmitted energy within the elongate passenger section 14, would further discourage those of average skill from attempting the development and design of a wireless audio information and entertainment system for airline passengers.

The illustrated embodiments, however, again deviate from conventional approaches by distributing the individual receiving antennas 25 among predetermined armrests 23 of the seats 13. A passenger control unit 22 and receiving antenna 25 is typically installed in one armrest per seat.

Figure 3:
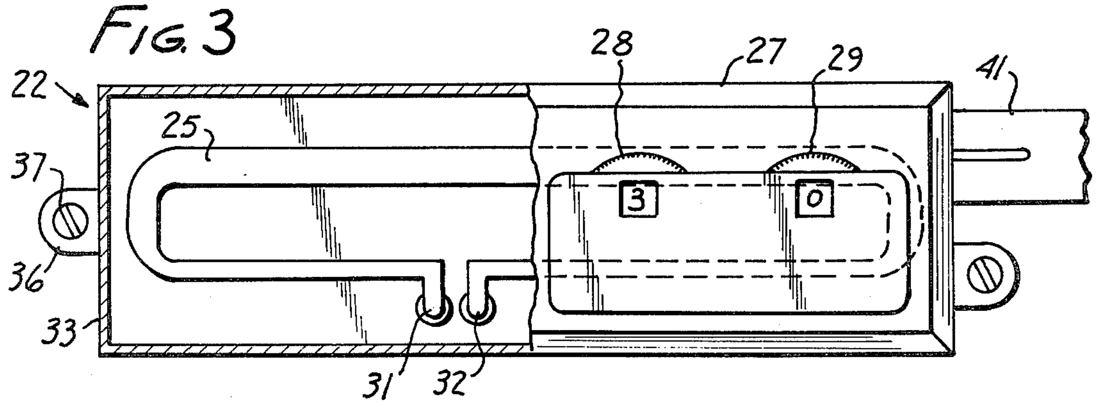
FIG. 3 is a passenger control unit equipped in accordance with a preferred embodiment of the subject invention.

As shown in FIG. 3, each receiving antenna 25 preferably is a loop antenna. In particular, a loop of copper foil or other conductive material is mounted or located behind the electrically insulating or plastic panel 27 which carries the passenger channel selection and volume controls 28 and 29. The loop antenna 25 is connected to a pair of antenna terminals 31 and 32 connected to equipment, located in a casing 33, for deriving the transmitted audio information in their audio channels from the radio frequency channels received with the antenna 25. The channel selector 28 with associated equipment in the casing 33 individually enables passenger to select audio information from among audio channels containing the derived audio information. The volume control 29 with associated equipment, including an electric signal-to-sound signal transducer in the casing 33, are connected to the channel selection enabling equipment for applying the selected audio information individually to the headsets. Typically, any one passenger control unit 22 thus applies the selected audio information to a single headset for a particular passenger.

Practical tests have now confirmed that systems of the illustrated type effectively couple the distributed receiving antennas 25 via seated passengers 35 to the transmitting antenna 16, and that the radio frequency channels containing the audio information are effectively transmitted in the preferred band between 72 and 73 MHz via the transmitting antenna 16, seated passengers 35 and distributed receiving antennas 25 to the predetermined armrests 23 equipped with passenger control units 22.

By way of example, the passenger control units 22 may be installed in armrests of both Hardman and Weber coach seats of the type frequently used aboard commercial aircraft. Lugs 36 and screws 37, or other suitable fasteners, may be employed for this purpose.

The antennas 25 with associated receiving equipment are thus at least partially mounted in predetermined armrests 23 of the seats 13. The receiving antenna 25 preferably is located at the side of the passenger control unit 22 facing a side of the seated passenger 35, so as to assure optimum antenna/passenger coupling through the plastic or dielectric control unit front panel 27. In this respect, the operation of the illustrated system has confirmed a fact previously known from the radio paging field, namely that the human body acts in effect as an antenna or coupling medium at frequencies below 100 MHz, while acting as a radio frequency shield at very high frequencies above the 100 MHz area. In the context of the subject invention, this helps the system to overcome the fact that the necessarily short loop antenna 25 cannot of itself achieve the gain of a one-quarter or one-half wavelength dipole.

The transmitted audio information typically of a high-fidelity character and, in a manner known per se, is pneumatically conveyed from the passenger control unit 22 via a dual channel plug-in device 41 and pair of flexible sound conducting tubes 42 to the passenger's headset 43.

As shown somewhat diagrammatically in FIG. 1, the aircraft is equipped with a number of lamps 38 for illuminating its interior as desired or necessary. For reasons of economy and efficiency fluorescent lamps preferably are employed for this purpose. The lamps 38 may have appropriate ballasts and fixtures and are energized from an alternating current power source 39 aboard the aircraft via a selectively actuable switch 40. Closure of that switch, or of similar individual switches for the individual passenger compartments, causes energization of the lamps 38 with alternating current from the source 39 for an illumination of the passenger section or compartments.

In other words, the energized lamps 38 emit or transmit electromagnetic radiation 44 of the type or wavelength known as light in the space 17. As indicated in FIGS. 2 and 3, the lamps 38 may be hidden from view, such as by blind ceiling portions, for an indirect illumination of the passenger section through reflection of the light from the ceiling 20.

During the viewing of motion pictures or video programs, the light switch 40 is typically open and the lamps 38 are deenergized. This may also be the case during flights at night time when most passengers are resting. In such instances, no interference from the lamps 38 takes place.

On the other hand, the lamps 38 are capable of disturbing radio transmissions in the passenger section 14 or space 17. As indicated above, such observed disturbance has defied attempts at elimination by conventional methods, such as the provision of electric filtering devices in the power line 47 through which the lamps 38 are energized.

On the other hand, the particular interference vanishes or is reduced to negligible values upon application of any of the measures of the subject invention and its embodiments as herein disclosed.

While no adherence to, or dependency from, any particular theory is intended, it is presently believed that the disturbance or interference overcome by the subject invention is due to a curious property of gas discharge lamps. In particular, the gas discharge or plasma reradiates or is an electrical conductor capable of modulating radio frequency energy or signals impinging thereon or of otherwise changing the electric field in the context of electromagnetic radiation or transmission. Of course, the presence of conductors in the field of an electromagnetic transmission is a rather frequent occurrence that can usually be managed in one way or another, where not deliberately desired for shielding purposes. However, a conductor in the form of a gas discharge or plasma of a gas discharge lamp energized with alternating current in effect constitutes a conductor that is switched on and off at an intermittence corresponding to the frequency of the energizing alternating current.

In other words, an alternating current energized gas discharge lamp effectively introduces into the field of a radio signal transmission a conductor which is switched on and off at line frequency or at harmonics thereof.

For instance, since every cycle of the line frequency has two half cycles, it is possible for the gas discharge to be switched at a rate equal to twice the line frequency. Measurements have, however, indicated that a hum signal generation at line frequency also may take place.

At any rate, the intermittently switched gas discharge or plasma acts as an absorber or radiator of electromagnetic energy. This undesirable effect is especially strong when the length of the gas discharge stands in a certain relationship to the wavelength of the transmitted radio frequency signal. For instance, multiples and submultiples of such wavelength evenuate particularly detrimental effects, since the gas discharge then acts in the manner of a dipole or similar resonant antenna, which absorbs or reradiates radio frequency energy transmitted in the space occupied by the lamp.

According to the subject invention, this discovery has led to several solutions of the underlying problem. One of these, by way of example and preferred embodiment, will presently be explained with the aid of FIG. 4.

Figure 4:
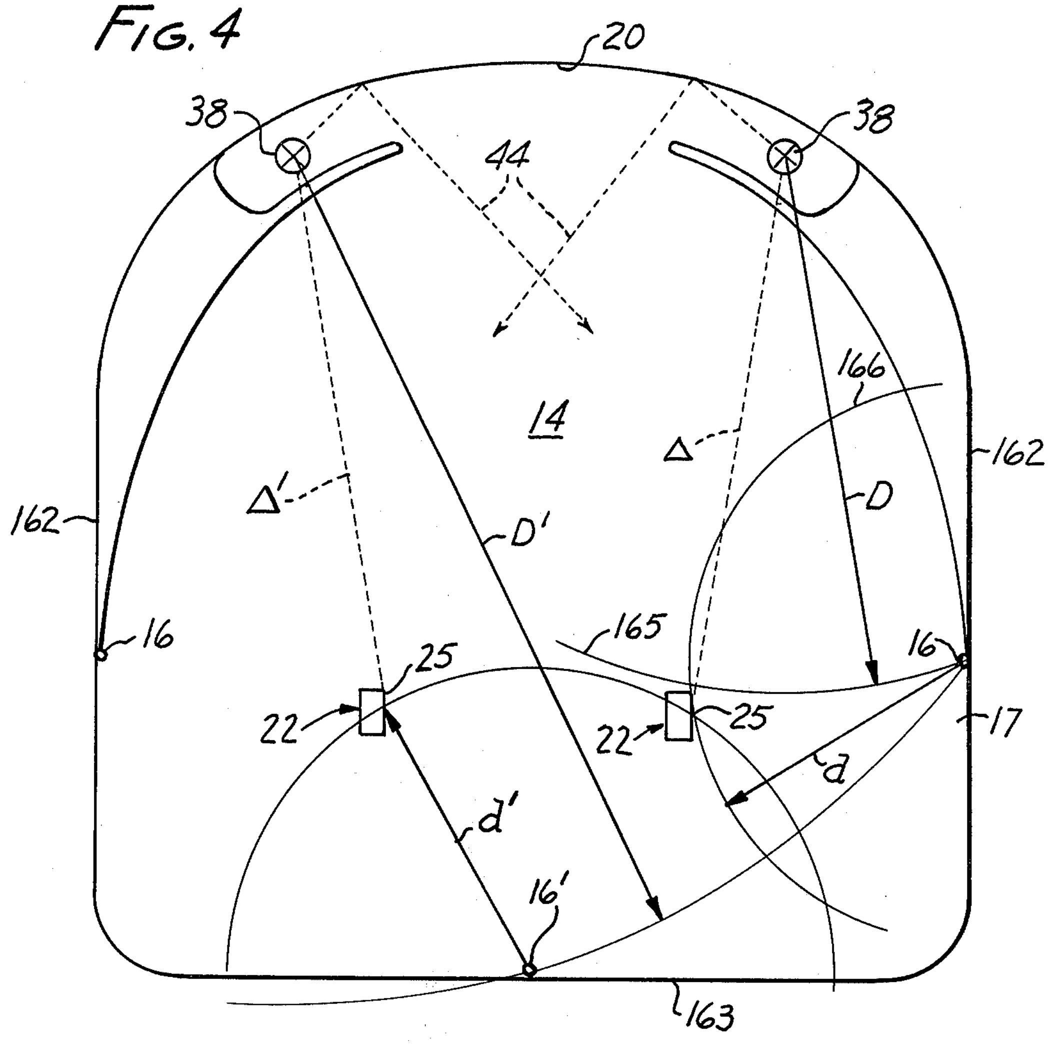
FIG. 4 is a diagrammatic cross-section through a passenger cabin equipped in accordance with a preferred embodiment of the subject invention.

In particular, FIG. 4 is a diagrammatic outline of a cross-section through the passenger cabin shown in 2. The passenger cabin or section 14 has a space 17 laterally enclosed by a ceiling 20, walls 161 and 162 and a floor 163, seen also in FIGS. 1 and 2. The first antenna 16 is located at a first distance D from the closest ceiling lamp 38 for emitting radio frequency signals in the space 17 or transmitting radio frequency signals into such space. Of course, the antenna 16, like any other transmitting or receiving antenna herein disclosed, is located within the confines of any fuselage or other metallic enclosure in the aircraft.

Within these confines, the antenna 16 may in principle be located at any appropriate point of an arc section 165 having the distance D as a radius relative to the the ceiling lamp 38 presently under consideration.

According to one preferred embodiment shown in FIGS. 1 and 2, the transmitting antenna 16 is run along or located in the side wall 162 at the mentioned spacing D from the closest ceiling lamp 38. In this respect, the side walls 162 and the floor 163 preferably are made of electrically insulating material to avoid shielding of the transmitting antenna or other radio frequency losses.

The second antenna or antennas 25 situated closest to the transmitting antenna 16 are located at a second distance d from the first antenna 16 for receiving the emitted radio frequency signals in the space 17. According to one preferred embodiment of the subject invention, the first distance D is larger than the second distance d. With the transmitting antenna 16 being positioned as shown in FIGS. 2 and 4, and with the second distance d being as shown in FIG. 4, the second antenna 25 in principle may be located anywhere along a circular arc section 166. However, as shown in FIGS. 2 to 4, the second or receiving antenna 25 is preferably located in the armrest unit 22. This also positions the second antenna 25 at a third distance Δ from the closest ceiling lamp 38, with the second distance d being smaller than the sum of the first and third distances D+Δ.

Also in accordance with a preferred embodiment, the third distance Δ is larger than the first distance D.

The chief goal of these embodiments is to maximize the ratio of the radio frequency power proceeding from the transmitting antenna 16 to the receiving antenna 25 along the path represented by the distance d relative to undesired radio frequency power proceeding along a path including the first and third distances D+Δ and including the ionized plasma of the closest ceiling lamp 38 when energized. In practice, this ratio maximizing goal has, of course, to be realized within the confines of structural and design realities in the space 17. In this respect, depending on the various positions feasible for the receiving antennas 25, and relevant dimensions within the space 17, it may be necessary to run a second antenna 16 along the opposite wall 162.

A preferred antenna location in this respect, which has been successfully tested in a large airliner, is a location at the floor 163 as shown in FIGS. 2 and 4 for a first or transmitting antenna 16'. The mentioned first distance in that case becomes the distance D' shown in FIG. 4, while the second distance between transmitting antenna 16' and receiving antennas 25 becomes the distance d'. Again, the first distance D' is larger than the second distance d'. Also, the third distance Δ' is larger than the first distance D', while the second distance d' is smaller than the sum of the first and third distances D'+Δ' in accordance with preferred embodiments of the subject invention.

In everyday operation, the lamp and antenna distance relationships herein disclosed permit the ceiling lights to be left energized while audio information is being communicated by the transmission of modulated radio frequency signals via the first and second antennas 16 and 25 to seated airline passengers in the space 17 having the gas discharge lamps 38 provided and energized therein. In practice, this has the important advantage of permitting the transmission of safety instructions and flight information to passengers seated in cabins illuminated economically and efficiently by fluorescent light.

In compliance with national and international air safety regulations, the passengers may thus be informed at the beginning of a flight of the functioning of oxygen masks, the use of swimming vests and the location of emergency exits. Moreover, the passengers may be provided with audio entertainment when the cabin lights are lit. In practice, this also works as a safety factor, since passengers who are able to listen to a pleasing musical program tend to be less nervous in delicate situations than passengers for whom no such diversion exists. Even on the ground, high-fidelity audio entertainment aboard airliners appears to shorten otherwise irritating delays and waiting times.

In accordance with a further preferred embodiment of the subject invention, the gas discharge in lamps used in the space 17 is confined to a length shorter than one quarter of the shortest wavelength of radio frequency signals transmitted in the space by the first antenna 16 or 16'.

For instance, as shown at 168 in the FIG. 2, short fluorescent lamps comparable in size to the width of a cabin window 19 may be employed for illumination purposes.

In this respect, fluorescent lamp lengths approaching 30 inches should be avoided for transmission frequencies in the vicinity of 100 MHz. For transmission frequencies in the 72 to 73 MHz band, the length of the fluorescent lamp 162 should be below 40 inches and preferably below the standard 36 inch length.

As seen in FIG. 2, if these length limitations on the gas discharge path are observed, the gas discharge lamps, such as the lamp 162, may be located closer to the transmitting antenna 16 than the distance D according to the embodiment illustrated in FIG. 4. The short lamp 168 may, for instance, be a reading light as employed in some commercial airliners.

Of course, short lamps of the type shown at 168 in FIG. 2 may replace the longer ceiling lights 38 within the scope of the subject invention.

In this respect, and in general, the lamp 168 represents a lamp having a straight gas discharge path shorter than one quarter of the shortest wavelength in the range provided by the transmitter 18 and emitted by the first antenna 16. Alternatively, and in accordance with a further embodiment, the gas discharge lamp may be confined to the desired shorter length by curving the lamp into a circular shape having a circumference shorter than one quarter of the shortest wavelength in the range of transmitted radio frequency signals.

For instance, and as shown in FIG. 2, the straight lamp 168 and even the ceiling lamps 38 may be replaced by circular fluorescent lamps 169 having the requisite short circumference.

Figure 5:
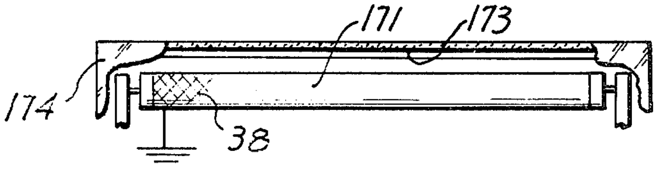
FIG. 5 is a side view of an elongate gas discharge lamp shielded according to embodiments of the invention.

According to a further embodiment shown in FIG. 5, gas discharge column or plasma interference of the type herein disclosed may be avoided by shielding the gas discharge lamp against radio frequency signals emitted by the first antenna 16 in the space 17. By way of example and as shown in FIG. 5, each fluorescent lamp 38 may be provided with a stocking 171 of loose wire mesh which, if desired, may be grounded. Whether such wire mesh stocking is grounded or not, the important point is that it presents to radio frequency signals transmitted by the antenna 16 a conductor that is always present whether the particular gas discharge lamp is lit or not, and that is also present during zero crossovers of the alternating current energizing the gas discharge in the lamp. Of course, the meshes of the stocking 171 are sufficiently wide and frequent to permit the emission of useful light into the passenger cabin by the lamp 38.

In lieu of a conductive wire mesh stocking 171, an electrically conductive, light transparent coating may be applied to the outside of the fluorescent tube 38. NESA coatings and other electrically conductive but light transparent deposits are known and useful for this purpose. Instead of applying such coating to the lamp itself, an electrically conductive and light transparent coating 173 may be provided on a glass or transparent plastic enclosure 174 of the lamp 38, the purpose always being to shield the gas discharge against radio frequencies signals emitted in the space 17 by the transmitting antenna or antenna system.

Figure 6:
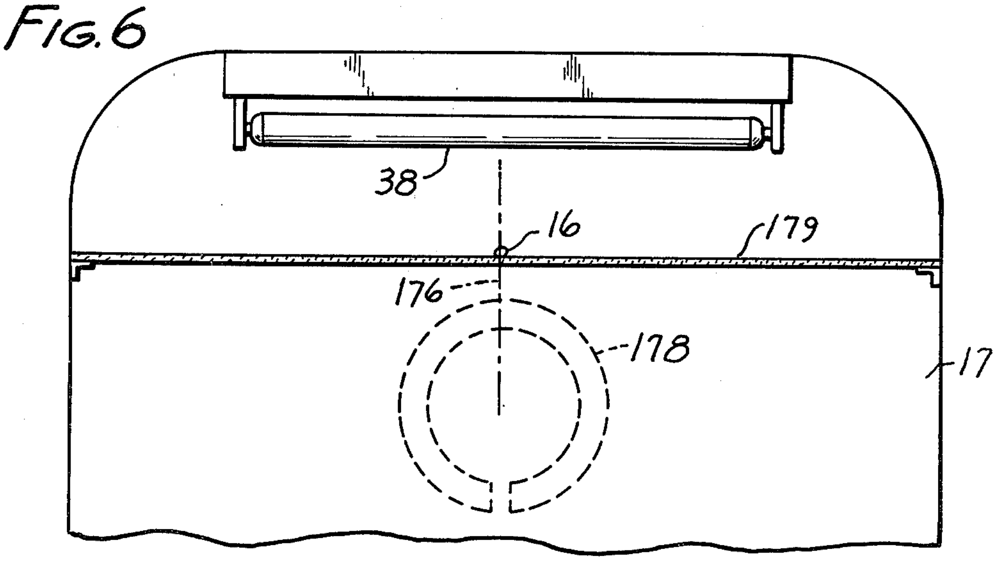
FIG. 6 is a fraction of a diagrammatic cross-section through a passenger cabin equipped according to a further embodiment of the invention.

In accordance with another embodiment shown in FIG. 6, the gas discharge lamp 38, such as through its mounting fixture, is mounted in a cross-polarized relationship to the first antenna 16 in the space 17. By way of example, and as shown in the upper part of FIG. 6, the first antenna 16 may be mounted in a first plane 176, and the lamp 38 may be mounted in a second plane extending at right angles to the first plane 176. The mentioned second plane in the illustrated embodiment is parallel to the plane on which FIG. 6 is drawn, while the second plane 176 extends at right angles or perpendicularly thereto.

As far as the lamp 38 is concerned, it may be said that such lamp has a straight gas discharge path positioned at right angles to the first antenna 16 in the space 17.

In accordance with the embodiment shown in the lower part of FIG. 6, the gas discharge lamp may, for instance, be a circular fluorescent lamp 178 having a circular gas discharge path provided in a second plane extending at right angles to the first plane 176 of the transmitting antenna 16.

As shown in FIG. 6, the transmitting antenna 16 may, for instance, be run along a blind ceiling 179 of a light-transparent and electrically insulating material. In viewing FIG. 6, it should also be recognized that the circular lamp 178 preferably is located above the transmitting antenna 16 as seen from the receiving antennas 25 distributed throughout the passenger section 14 (see FIG. 2).

The cross-polarization principle illustrated in FIG. 6 works best if no larger electrically conductive surfaces are present. In this respect, such surfaces tend to distort the radio frequency field in the space 17 and thus the cross-polarization relationships. In an aircraft environment, where typically metallic fuselages are employed, the embodiment of FIG. 6 may thus not be operative without a combination with other embodiments, such as those shown in FIGS. 4 and 5 and/or those discussed below. However, the embodiment of FIG. 6 still is of utility of buildings and other areas where no large electrically conductive surfaces could distort the radio frequency field in the space 17.

In accordance with a further embodiment of the subject invention, the power supply generator 39 is operated to provide an alternating current having a frequency above the highest useful frequency of the alternating current component in the communicated signal. For instance, in a wireless passenger or audience entertainment and information system of the type herein disclosed, the highest communicated audio frequency may be 15 kHz or less. In that case, the power supply 39 would energize the lamps 38 with an alternating current having a frequency above 15 kHz. Of course, care has to be taken that such an energizing frequency would not disturb other instruments or communications in the aircraft. The embodiment just discussed may thus not be universally applicable or practical. However, with certain control and other signals having an alternating current component of less than, say, 500 Hz, it may be very practical to energize the gas discharge lamps with alternating current having a frequency of, say, 600 Hz.

In accordance with a preferred embodiment of the subject invention, frequency modulation may be employed for transmitting the audio channels or other signals. In this respect, the term "frequency modulation" is employed generically to cover frequency and phase modulation.

As before, the first antenna 16 or 16' emits the modulated radio frequency carrier in the space 17, and the second antennas 25 receive such emitted radio frequency carrier. The gas discharge lamps 38 are again energized with alternating current for emitting light in the space 17. It has been observed in this respect that the above mentioned effect, believed to be due to the intermittently switched gas discharge or plasma, imposes an amplitude modulation on the frequency modulated carrier in the space 17, when such carrier is transmitted via the first and second antennas 16 and 25 and the space 17 having the gas discharge lamps 38 provided and energized therein.

According to the currently discussed embodiment of the subject invention, and as more fully disclosed below, a frequency modulation receiver in each armrest unit 22 is connected to the corresponding second antenna 25 and is provided with an amplitude modulation rejection for the amplitude modulation imposed by the gas discharge lamps 38.

Accordingly, when the transmitted radio frequency carrier is received and demodulated with a frequency modulation receiver in an armrest unit 22, in order to regain the audio signals therefrom, the amplitude modulation imposed by the gas discharge lamp 38 is rejected at the same time.

The different aspects and embodiments of the invention herein disclosed may in practice be combined with each other. For instance, the fluorescent lamps 38 may be shielded in the manner illustrated in FIG. 5, even when the distance relationships are observed according to FIG. 4. Similarly, the cross-polarization principle of FIG. 6 may be combined with the distance and/or shielding principles of FIGS. 4 and/or 5. This possibility of combination of disclosed features extends, of course, also to the above mentioned confinement of the length of the length of the gas discharge path (see 168 and 169 in FIG. 2) and to the above mentioned amplitude modulation rejection.

Also, the method steps herein disclosed for various combinations according to the subject invention and embodiments thereof, need not necessarily be performed or effected in a disclosed particular sequence, but may be performed or effected in another operative sequence.

According to a preferred embodiment of the subject invention, a frequency modulation system is employed for transmitting the audio information and entertainment to the passenger seats. In this respect, FIGS. 7 to 9, when aligned longitudinally in series, constitute a circuit diagram of frequency modulation receivers for the passenger control units 22 in accordance with a preferred embodiment of the subject invention.

Figure 8:
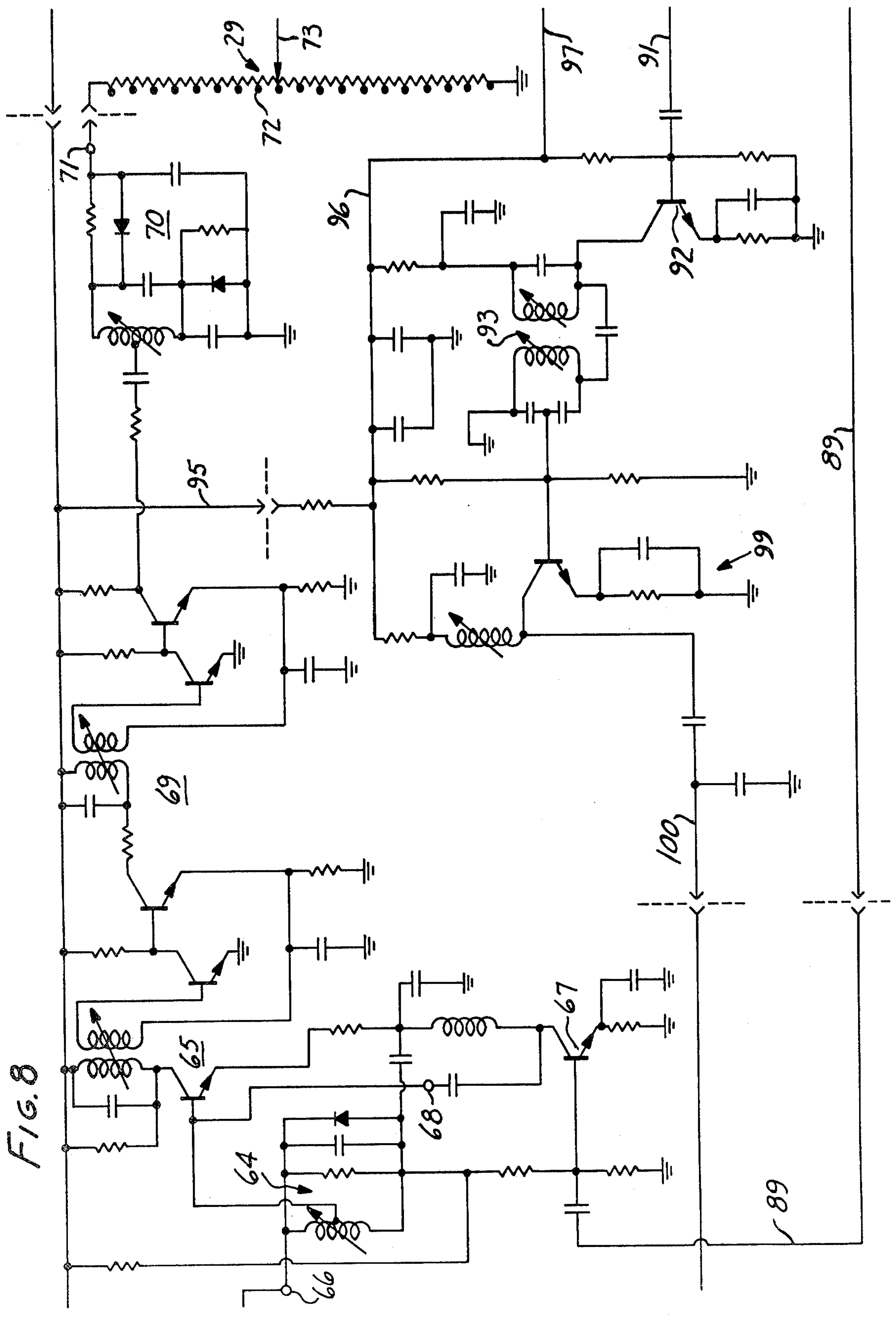
Figure 9:
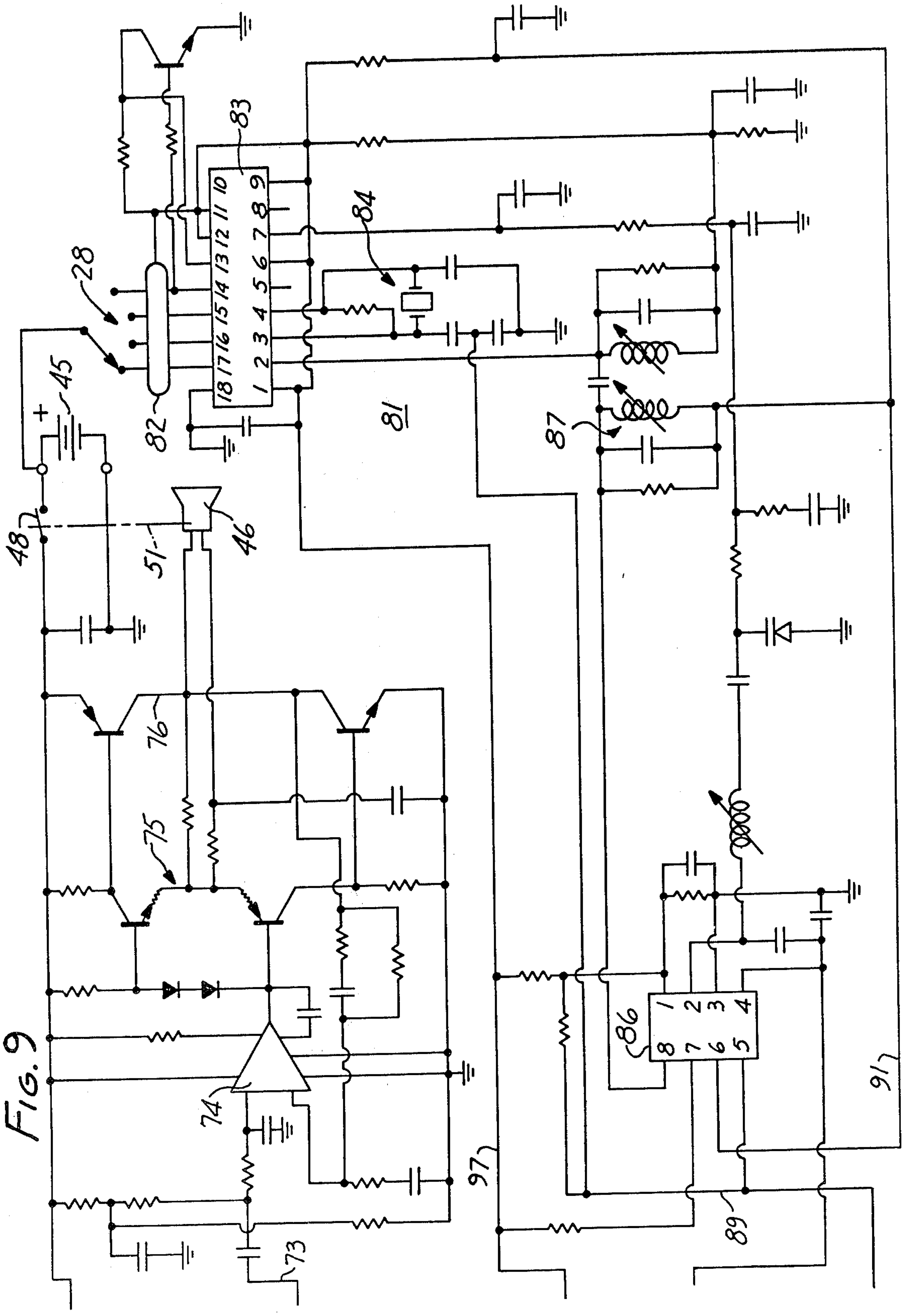

As indicated in FIG. 9, each passenger control unit 22 can be individually powered by a replaceable battery 45. Use of a replaceable battery in each passenger control unit 22 as its power source aids the wireless system in completely eliminating all electric leads from the chronically vulnerable cabin wall or floor/passenger seat interface. On the other hand, use of batteries at first sight has the obvious disadvantage of requiring frequent maintenance to either replace or recharge the batteries in the large number of passenger control units. The preferred embodiment of the frequency modulation receiver shown in FIGS. 7 to 9 overcomes this apparent handicap by providing full volume sound at its output transducer 46 at a power requirement permitting prolonged operation between needed battery replacements. For example, an operating time on the order of 1000 hours results from a battery having a 20 ampere hour capacity. On the average, 1000 hours of operation translates practically into about one year of intermittent service as to a typical passenger aircraft.

The power source 45 may be disconnected from the set by an on-off switch 48. To preclude battery drain at the end of a listening cycle, the preferred embodiment according to FIG. 9 combines the switch 48 with the sound transducer 46 as indicated by the phantom line 51, so as to effect closure of the switch 48 only upon insertion of the pneumatic takeoff plug 41 (see FIG. 3) into the sound transducer 46. Conversely, the safety switch 48 is automatically reopened when the headset plug 41 is removed from the passenger control unit 22. Since flight attendants routinely collect all headsets near the end of each flight, the automatically actuated switch 48 as a minimum precludes battery drain between flight operations.

Figure 7:
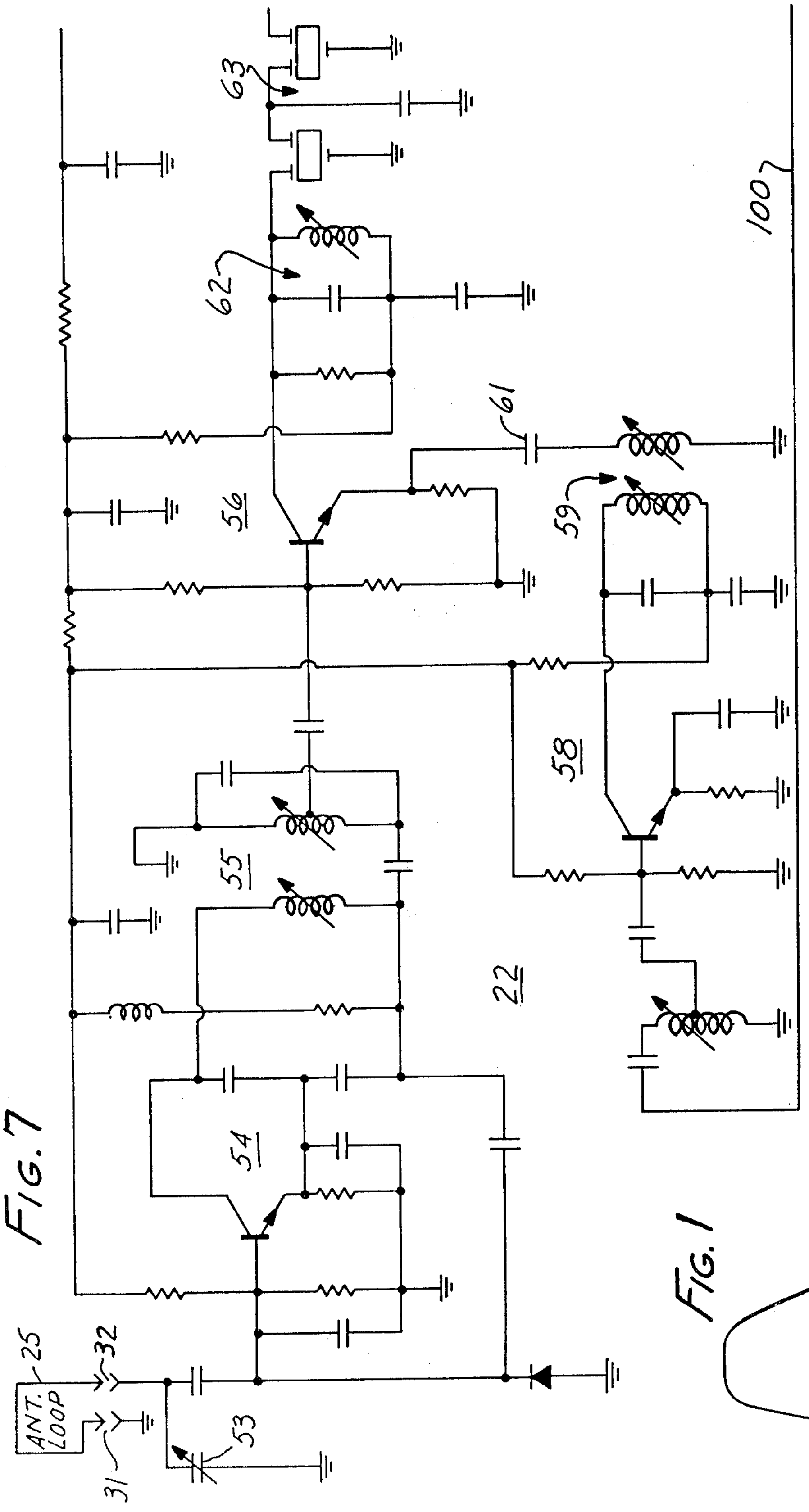
FIGS. 7 to 9, when positioned in series along their longitudinal axes, constitute a circuit diagram of a radio receiver in a passenger control unit according to a preferred embodiment of the subject invention.

As shown in FIG. 7, the loop antenna 25 is in the passenger control unit connected to ground via terminal 31 and to a trimmer capacitor 53 and HF broadband amplifier 54 via antenna terminal 32. The amplified high frequency signal proceeds via a double tuned bandpass filter circuit 55 to a first mixer 56 which produces the first intermediate frequency or IF signal. The first input of the mixer 56 is supplied as mentioned above by the HF amplifier 54 and BPF 55. A second input of the mixer 56 is supplied by a frequency multiplier 58 via transformer 59 and coupling capacitor 61. The multiplier 58 is part of a synthesizer shown primarily in FIGS. 8 and 9, and, as more fully described below, enabling passengers to tune in on the various transmitted channels of the audio entertainment and information system.

The output of the IF mixer proceeds via impedance matching circuit 62 and crystal filter 63 to a terminal 66 and filter output impedance matching circuit 64 shown in FIG. 8, and hence to a second mixer 65.

The second mixer 65 receives a first input from the BPF 63 via the matching circuit 64, and a second input from the above mentioned synthesizer, shown more fully in FIG. 9, via a buffer amplifier 67 and terminal 68. The second mixer 65 thus supplies the second IF via a second amplifier 69 to the discriminator 70. The demodulated or electric audio signal is applied via a terminal 71 across the resistor 72 of the volume control 29. This volume control is preferably of a stepped type to enhance the reliability of the volume control adjustment mechanism.

The volume controlled electric sound signal is applied via wiper lead 73 to an audio amplifier 74, followed by power amplifier stages 75 and 76 which drive the pneumatic output transducer 46 with full peak-to-peak battery voltage power without any transformer or other significant loss-producing components.

In principle, each passenger control unit could be tuned by means of a variable-capacitor or similar traditional radio tuning circuit. Each passenger could then turn a dial until he or she reaches a desired audio channel. Such a continuous type of channel selection would, however, compare poorly to the stepped or detent-type of channel selection now available in wired systems.

Of course, one could provide the channel selector switch with detents at the intended location of the various channels. This, however, would not provide an accurate channel selection in a wireless system of the traditional type, since, as in the case of VHF television channel selection, some fine tuning is often required in addition to the basic actuation of the stepped rotary channel selector. In practice, the need for such fine tuning would burden the average passenger unduly, especially in a dark or dimly lit environment.

Using state of the art components and technology, the preferred embodiment illustrated in FIGS. 7 to 9 provides for accurate and drift-free stepped or detent-type channel selection with a frequency synthesizer 81 in combination with the above mentioned essential components of the system.

In particular, FIG. 9 shows the channel selector 28 as a rotary switching device for providing at 82 four binary coded signals for the selection of, say, 12 channels in a hexadecimal system. By way of example, the rotary switch 28 may be provided with four parallel contacts actuated by four ganged cams for providing the four binary coded signals required for the desired channel selection process.

The output of the rotary selector switch is applied to a synthesizer integrated circuit 83 which, by way of example, may be of the type MC 145106 as described, for instance, in the MOTOROLA SEMICONDUCTORS Advance Information Bulletin ADI-431 (1977).

A crystal controlled frequency standard 84 establishes all frequencies for the various channels in the particular passenger control unit 22.

As shown in FIG. 9, the frequency syntheziser circuitry includes an oscillator and mixer component 86 which, by way of example, may be provided by an integrated circuit of the type CA3028 as shown, for instance, in the RCA INTEGRATED CIRCUITS DATABOOK (1976), pp. 118 to 122.

The mixer output of the integrated circuit 86 is applied to a bandpass filter 87 and hence to the number 2 input of the synthesizer integrated circuit 83. An output of the frequency standard 84 is also applied via a lead 89 to the number 5 input of the oscillator and mixer circuit 86 and to the second input of the second mixer 65 via buffer amplifier 67 shown in FIG. 8.

The number 4 output of the integrated circuit component 86 is applied via a lead 91 to an isolating buffer amplifier 92 and hence to a bandpass filter 93. Leads 95, 96 and 97 supply battery power to the various components of the synthesizer.

The output of the BPF 93 is applied to a first frequency multiplier 99 and hence via lead 100 to the above mentioned frequency multiplier 58 for application to the second input of the first mixer 56, as mentioned above. The passenger control unit according to the illustrated preferred embodiment is thus capable of providing detented channel selection without the use of any tunable oscillator of a traditional type.

Figure 10:
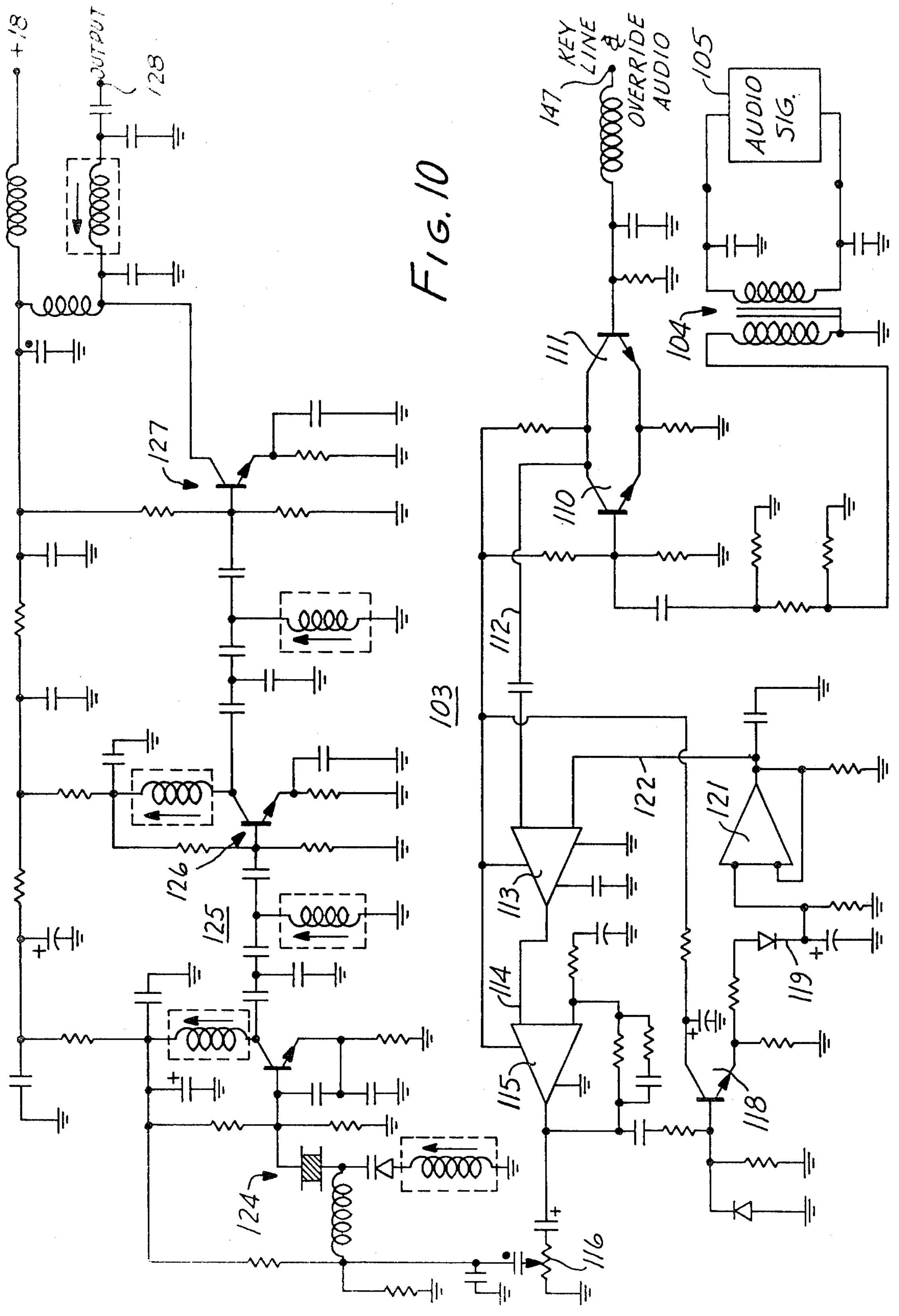
FIG. 10 is a circuit diagram of a radio frequency audio transmitter according to a preferred embodiment of the subject invention.

FIG. 10 is a circuit diagram of a frequency modulation transmitter that may be employed for each of the audio channels. The transmitter 103 has an input transformer 104 for receiving an electric audio signal from a source 105. By way of example, the source 105 may include a playback channel of a sound recorder or playback machine or the output of the sound accompaniment portion of a motion picture projection system or of a prerecorded video tape playback machine. In this respect, FIG. 2 shows a motion picture or video projector 106 mounted in or at the ceiling 20 of the passenger section 14 for projecting motion picture or video presentations 107 onto a screen 108 for viewing by seated passengers 35 listening at the time to a sound accompaniment of the pictorial presentation.

The output of the transformer 104 of the transmitter according to FIG. 10 is applied to one of two reciprocal switching transistors 110 and 111. The output of these switching transistors is applied via a lead 112 to a first input of an automatic gain control stage 113. The output of the gain controlled audio signal is applied via lead 114 to an operational amplifier 115 providing a relatively flat amplification. A potentiometer 116 at the output of the amplifier 115 permits setting of the deviation of the transmitter. The automatic gain control also includes an emitter follower 118 connected to a feedback circuit and driving a detector 119 with time constant. A direct-current voltage follower 121 derives from the detector 119 a gain control signal for the automatic gain control stage 113 via a lead 122.

The audio signal appearing at the wiper of the potentiometer 116 is modulated on a carrier by means of a varicap crystal oscillator 124. The second harmonic of the oscillator frequency is selected by the double tuned circuit 125. In this manner, a carrier is phase or frequency modulated with the audio signal in the particular channel. This modulation is followed by a further frequency doubling in a frequency doubler 126 driving an output amplifier 127. The modulated carrier appears at the transmitter output 128.

In the illustrated embodiment there are as many transmitters of the type of transmitter 103 as there are audio channels. These transmitters provide several radio frequency carriers, each corresponding to a different one of the audio signal channels and each having a frequency different from the frequency of any other carrier of the several carriers individually provided by the transmitter 103 and the other transmitters of the system.

The modulator at 124 and 125, and the modulators of the other transmitters of the system modulate the several radio frequency carriers with audio signals in the audio channels by modulating the audio signals in each channel on the corresponding radio frequency carrier.

The modulated radio frequency carriers are applied at their respective frequencies directly to the single antenna or single antenna system 16. In other words, each modulated radio frequency carrier is applied to the antenna 16 at its transmitter output frequency, without any additional modulation, heterodyning or frequency shifting.

In the case of an amplitude modulation (AM) system, each modulated carrier is applied at its carrier frequency to the antenna 16. In the case of a frequency modulation (FM) system, each modulated carrier is applied to the antenna at its carrier frequency, plus/-minus the frequency excursion or deviation proportional to the amplitude of the modulating signal.

The applied modulated radio frequency carriers are then transmitted at their respective frequencies into the space within the passenger section 14 by the single antenna system or single antenna 16.

To this end, a radio frequency channel combiner 132 may be employed between the transmitter 103 and the other channel transmitters on the one hand, and the antenna or antenna system 16 on the other hand. In particular, the output terminal 128 of the transmitter 103 shown in FIG. 10 appears as input terminal 128 of the radio frequency combiner 132 in FIG. 11.

In order to combine the distinct modulated radio frequency signals from the several transmitters 103, etc., the combiner 132 comprises a series of combining or hybrid circuits, such as a series of hybrid transformers 133, each having two inputs, such as 128 and 128', for receiving the modulated radio frequency outputs from two transmitters 103, etc.

Figure 11:
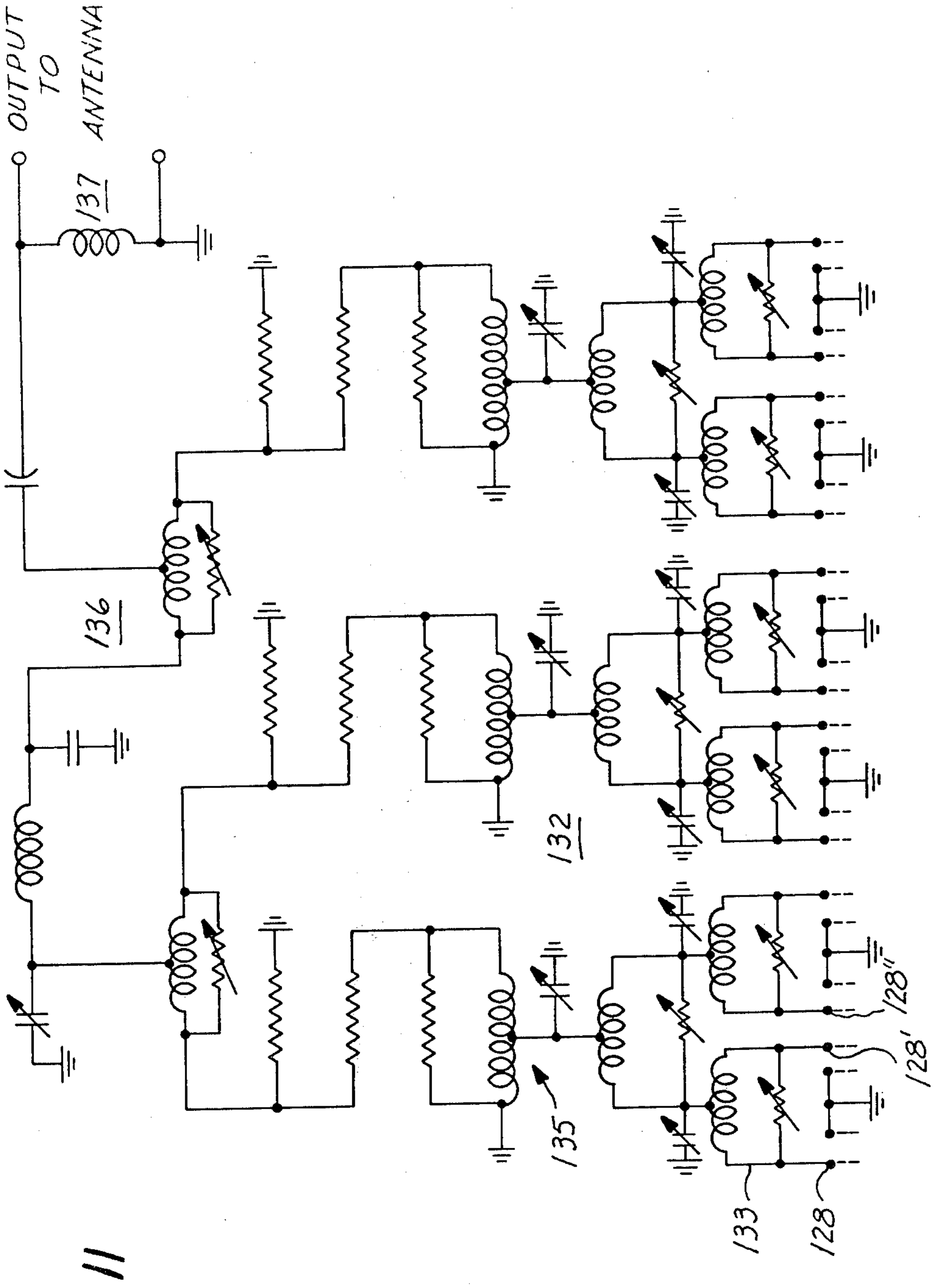
FIG. 11 is a circuit diagram of a combiner for applying different radio frequency channels to the transmission antenna according to a preferred embodiment of the subject invention.

In the combiner 132 shown in FIG. 11 there are, by way of example, six hybrid transformers 133 for combining twelve audio-modulated radio frequency channels or carriers in pairs. These pairs are combined with other pairs of the twelve channels in a binary manner [2, 4, 8 . . .] by further hybrid circuitry 135 until all twelve channels or audio-modulated radio frequency channels appear at a single combiner output 137.

If desired or necessary step-up transformer and attenuator circuitry 136 may be employed for impedance leveling purposes, in order to equalize the power levels of the modulated radio frequency carriers transmitted through the passenger section 14.

The combiner 132 thus linearly sums the modulated radio frequency carriers, with its hybrid circuitry 133 and 135 assuring practical isolation of these carriers from each other, and thus avoiding undesired cross-modulation or other non-linear modulation effects. The linearly summed modulated carriers appearing at the combiner output 137 are directly applied to the antenna or single antenna system 16, without any heterodyning, frequency shifting or modulation, other than the frequency modulation of each carrier by the corresponding audio channel in the modulator circuitry 124 and 125 and the frequency multiplication at 126 shown in FIG. 10.

Unlike in the case of time division multiplexing, the modulated radio frequency carriers in the subject embodiment are applied simultaneously to the single antenna or antenna system 16.

Unlike in the case of conventional forms of frequency division multiplexing, the modulated radio frequency carriers in the subject embodiment are applied at their respective frequencies directly to the single antenna or antenna system 16. In practice, this avoids the highly complex receiving equipment necessary for conventional frequency division multiplexing, which could not readily be implemented in the context of aircraft passenger seats. Also, while FIG. 11 illustrates a specially designed combiner 132, such circuitry is commercially available, though being manufactured and sold for a different purpose.

Figure 12:
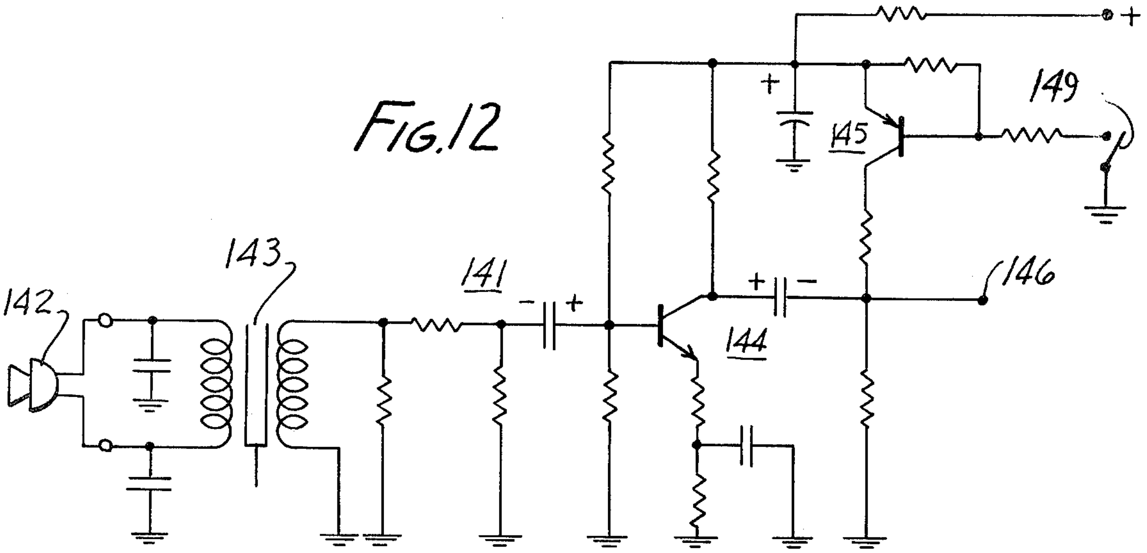
FIG. 12 is a circuit diagram for an override audio apparatus which may be employed in the system according to a preferred embodiment of the subject invention.

Operational procedures and other considerations require from time to time that passengers be reliably reached with information from the captain or other officer or from a supervisory flight attendant. To this end, FIG. 12 shows an override audio circuit 141 which is driven by a microphone 142. Electric signals corresponding to words spoken into the microphone 142 are applied via an input transformer 143 to audio amplifier stage 144. The amplified audio is applied via an output terminal 146 to override audio terminals 147 of the transmitters 103 et seq. of all channels simultaneously.

In order to generate a key line signal, the officer or flight attendant pushes a microphone switch 149. This turns on a transistorized switch 145, generating a positive voltage at the output 146, upon which is superimposed the audio output of 144. The audio signal and the direct current resulting from the key line activation are applied in combination to the input terminal 147 shown in FIG. 10. The direct current voltage of this combination raises the base of transistor 111 to a more positive voltage than the base of transistor 110, causing the current normally flowing in transistor 110 to be diverted to transistor 111. In consequence, the audio applied from the source 105 to the transistor 110 is turned off, while the audio from the microphone 142 is turned on, with reference to the output 112. This simultaneously occurs in all channels, so that none of the passengers will miss the particular information or instruction. As already indicated above, the system according to the illustrated preferred embodiment of the subject invention is capable of satisfying this and all the other above mentioned requirements for the passengers throughout an entire aircraft of the size of a Boeing 727 at a maximum antenna power input of only 10 mW per channel. At the same time, the employed frequency band according to the subject invention prevents windows 19 and other cutouts on the aircraft from radiating any significant amount of the transmitted radio energy. While the transmission of audio information has been emphasized therein, the disclosed principles could also be employed to transmit video information, control signals or other data.

Figure 13:
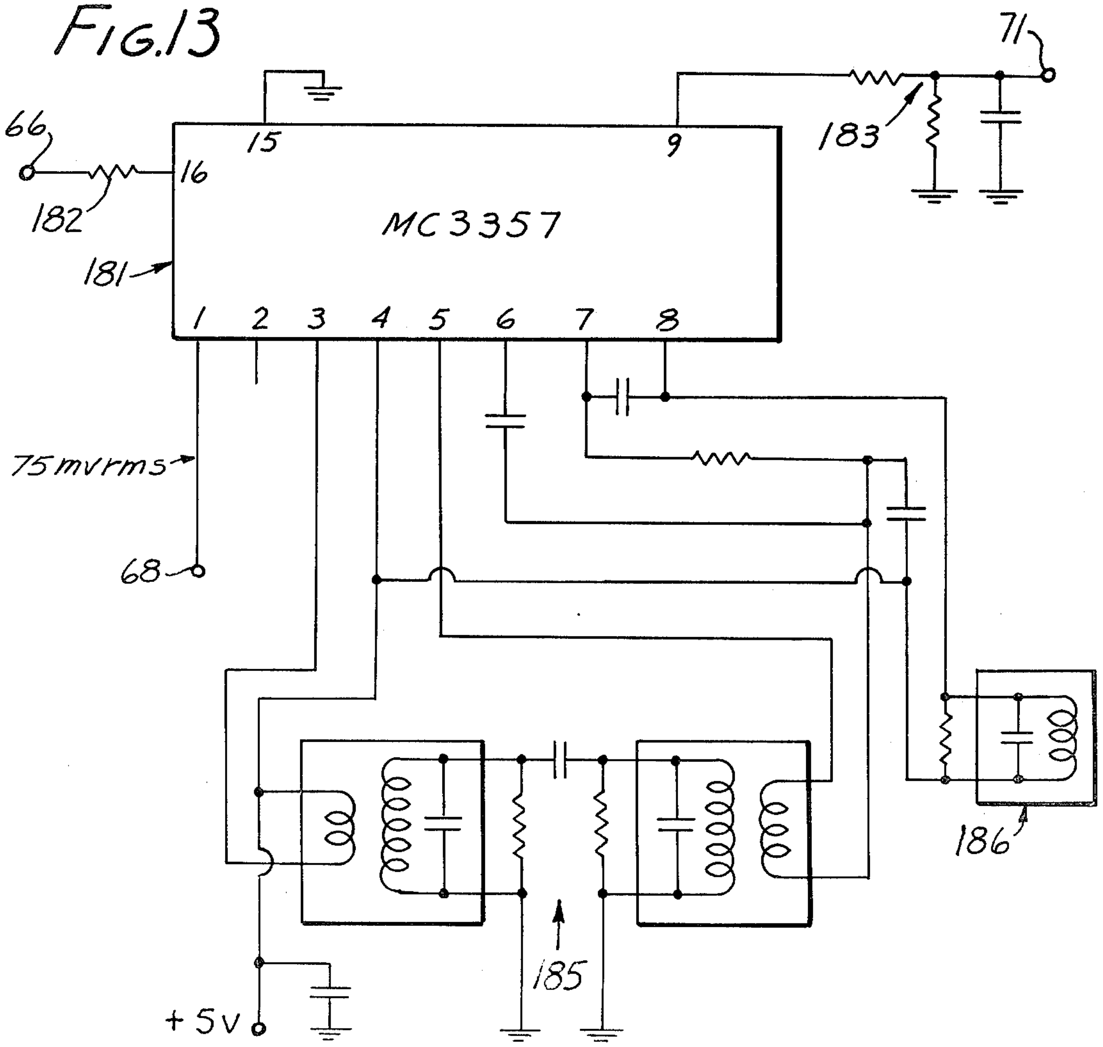
FIG. 13 is a circuit diagram of a modification of the circuit of FIG. 8 according to a further embodiment of the subject invention.

A method and means for rejecting the above mentioned amplitude modulation imposed on the emitted radio frequency carrier or signal by the energized fluorescent or gas discharge lamps is shown in FIG. 13.

The central part of FIG. 13 is an integrated circuit or chip 181 having numered pins connected as shown. The integrated circuit 181 may take the place of the circuitry shown in FIG. 8 as connected between the terminals 66, 68 and 71.

In particular, the pin No. 16 of the integrated circuit 181 of FIG. 13 is connected to the input terminal 66 via a resistor 182 as shown in FIG. 13. On the other hand, the pin No. 9 of the integrated circuit 181 is connected via a filter 183 to the output terminal 71 which leads to the volume control 72 shown in FIG. 8 and to the audio amplifier circuitry shown in FIG. 9.

The pin No. 1 of the integrated circuit 181 is connected to the terminal 68 which, as shown in FIG. 8 and explained above, receives a frequency standard via buffer 67 and lead 89 from the synthesizer. A bandpass filter arrangement 185 is connected between the pins 3, 4, 5 and 6 of the integrated circuit 181 as shown in FIG. 13. Moreover, pins 7 and 8 of the integrated circuit 181 are coupled to a discriminator section quadrature coil 186.

The integrated circuit 181 has a relatively high amplitude modulation rejection. By way of example, the integrated circuit 181 may be of the type MC 3357 as described, for instance, in the MOTOROLA SEMICONDUCTORS Advance Information Bulletin ADI-433 (1977).

The input pin No. 16 of the integrated circuit 181 receives the output of the first IF mixer via the impedance matching circuit 62 and crystal filter 63 shown in FIG. 7, and the terminal 66 and resistor 182 shown in FIG. 13. Such IF signal is applied in the integrated circuit 181 to the second mixer which also receives the above mentioned frequency standard from the synthesizer via terminal 68 and pin No. 1.

After AM rejection and FM demodulation, the regained audio signal is applied via the output terminal 71 shown in FIG. 13 to the volume control 72 shown in FIG. 8 and audio amplification stages shown in FIG. 9 for audible reproduction by the transducer 46 and earphones 43.

Amplitude rejection circuitry and techniques other than those specifically shown and described may, of course, be employed in the FM receiver connected to the corresponding second antenna 25.

The subject invention thus meets all of its initially mentioned objects. While emphasis has been placed herein on a wireless airline passenger entertainment system, the subject invention and its embodiments have utility in many other areas where gas discharge lamps would interfere with radio frequency signal transmission. In this respect, systems for the indoor illumination of growing plants, wireless telephone systems and other instances of utility of the subject invention have been mentioned above in the Disclosure Statement.

The subject extensive disclosure will suggest or render apparent various modifications and variations within the spirit and scope of the subject invention to those skilled in the art.

I claim:

1. In a method of transmitting electromagnetic radiation in a space for illumination and communication, the improvement comprising in combination the steps of:

positioning a gas discharge lamp in said space;

positioning a first antenna at a distance from said lamp for emitting radio frequency signals within a predetermined wavelength range in said space:

positioning a second antenna at a distance from said first antenna and from said lamp for receiving said emitted radio frequency signals in said space;

confining the gas discharge in said lamp to a length shorter than one quarter of the shortest wavelength in said range;

energizing said lamp with alternating current for emitting light in said space;

providing radio frequency signals within said wavelength range for transmission by said first antenna and reception by said second antenna; and transmitting said radio frequency signals via said first and second antennas and said space having said gas discharge lamp provided and energized therein.

2. A method as claimed in claim 1, wherein:

said gas discharge lamp is confined to said shorter length by providing said lamp with a straight gas discharge path shorter than one quarter of the shortest wavelength in said range.

3. A method as claimed in claim 1, wherein:

said gas discharge lamp is confined to said shorter length by curving said lamp into a circular shape having a circumference shorter than one quarter of the shortest wavelength in said range.

4. A method as claimed in claim 1, including the step of:

mounting said gas discharge lamp in a cross-polarized relationship to said first antenna in said space.

5. A method as claimed in claim 1, including the step of:

shielding said gas discharge lamp against said radio frequency signals transmitted by said first antenna in said space.

6. In a method of transmitting electromagnetic radiation in a space for illumination and communication, the improvement comprising in combination the steps of:

providing a first antenna for emitting radio frequency signals in said space;

providing a second antenna for receiving said emitted radio frequency signals;

providing a gas discharge lamp in said space;

shielding said gas discharge lamp against said radio frequency signals transmitted by said first antenna in said space;

mounting said gas discharge lamp in a cross-polarized relationship to said first antenna in said space;

energizing said lamp with alternating current for emitting light in said space;

providing radio frequency signals for transmission by said first antenna and reception by said second antenna; and transmitting said radio frequency signals via said first and second antennas and said space having said gas discharge lamp provided and energized therein.

7. A method as claimed in claim 6, including the step of:

mounting said first antenna in a first plane; and mounting said lamp in a second plane extending at right angles to said first plane.

8. A method as claimed in claim 6, including the steps of:

mounting said first antenna in a first plane;

providing said gas discharge lamp with a circular gas discharge path; and positioning said circular gas discharge path in a second plane extending at right angles to said first plane.

9. A method as claimed in claim 6, including the steps of:

providing said gas discharge lamp with a straight gas discharge path; and positioning said straight gas discharge path at right angles to said first antenna in said space.

10. In a method of transmitting electromagnetic radiation in a space for illumination and communication, the improvement comprising in combination the steps of;

positioning a first antenna for emitting radio frequency signals in said space;

installing a second antenna for receiving said emitted radio frequency signals;

positioning a gas discharge lamp in said space;

shielding said gas discharge lamp against said radio frequency signals emitted by said first antenna in said space;

energizing said lamp with alternating current for emitting light in said space;

providing radio frequency signals for transmission by said first antenna and reception by said second antenna; and transmitting said radio frequency signals via said first and second antennas and said space having said gas discharge lamp provided and energized therein.

11. In a method of transmitting electromagnetic radiation in a space for illumination and for communication of a signal having an alternating current component, the improvement comprising in combination the steps of:

modulating said signal on a radio frequency carrier;

providing a first antenna for emitting said modulated radio frequency carrier in said space;

providing a second antenna for receiving said emitted radio frequency carrier;

providing a gas discharge lamp in said space;

shielding said gas discharge lamp against said radio frequency signals transmitted by said first antenna;

providing an alternating current having a frequency above the highest useful frequency of said alternating current component;

energizing said lamp with said alternating current for emitting light in said space; and transmitting said radio frequency signals via said first and second antennas and said space having said gas discharge lamp provided and energized therein.

12. A method as claimed in claim 11, including the step of:

mounting said gas discharge lamp in a cross-polarized relationship to said first antenna in said space.

13. A method as claimed in claim 11, including the steps of:

providing radio frequency signals within a predetermined wavelength range; and confining the gas discharge in said lamp to a length shorter than one quarter of the shortest wavelength in said range.

14. In a method of transmitting electromagnetic radiation in a space for illumination and for communication of a signal, the improvement comprising in combination the steps of:

modulating said signal on a radio frequency carrier by frequency modulation;

positioning a first antenna for emitting said modulated radio frequency carrier in said space;

installing a second antenna for receiving said emitted radio frequency carrier;

positioning a gas discharge lamp in said space;

energizing said lamp with alternating current for emitting light in said space, whereby an amplitude modulation is imposed on said emitted radio frequency carrier;

providing a frequency modulation receiver with an amplitude modulation rejection for said amplitude modulation;

connecting said receiver to said second antenna;

transmitting said modulated radio frequency carrier via said first and second antennas and said space having said gas discharge lamp provided and energized therein; and receiving and demodulating said transmitted radio frequency carrier with said frequency modulation receiver to regain said signal therefrom, while rejecting said amplitude modulation.

15. A method as claimed in claim 14, including the step of:

mounting said gas discharge lamp in a cross-polarized relationship to said first antenna in said space.

16. A method as claimed in claim 14, including the step of:

shielding said gas discharge lamp against said radio frequency carrier transmitted by said first antenna.

17. A method as claimed in claim 14, including the step of:

confining the gas discharge in said lamp to a length shorter than one quarter of the wavelength of said radio frequency carrier.

18. A method as claimed in claim 14, including the steps of:

providing said signal within a predetermined frequency band; and providing said alternating current for energizing said lamp with a frequency higher than said frequency band.

19. A method as claimed in claim 1, 6, 10, 11 and 14, including the steps of:

positioning said first antenna at a first distance from said lamp;

positioning said second antenna at a second distance from said first antenna; and making said first distance larger than said second distance.

20. A method as claimed in claim 1, 6, 10, 11 and 14, including the steps of:

positioning said first antenna at a first distance from said lamp;

positioning said second antenna at a second distance from said first antenna and at a third distance from said lamp; and making said first distance larger than said second distance, and said second distance smaller than the sum of said first and third distances.

21. A method as claimed in claim 1, 6, 10, 11 and 14, including the steps of:

positioning said first antenna at a first distance from said lamp;

positioning said second antenna at a second distance from said first antenna and at a third distance from said lamp; and making said first distance larger than said second distance and said third distance larger than said first distance.

22. A method as claimed in claim 1, 6, 10, 11 or 14, including the steps of:

providing said first antenna at a first distance from said lamp for emitting radio frequency signals in said space;

providing said second antenna at a second distance from said first antenna for receiving said emitted radio frequency signals in said space; and making said first distance larger than said second distance.

23. A method as claimed in claim 1, including the step of:

positioning said second antenna at a third distance from said lamp, and making said second distance smaller than the sum of said first and third distances.

24. A method as claimed in claim 22, including the step of:

positioning said second antenna at a third distance from said lamp, and making said third distance larger than said first distance.

25. In apparatus for transmitting electromagnetic radiation in a space for illumination and communication, the improvement comprising in combination:

means including a first antenna for emitting radio frequency signals within a predetermined wavelength range in said space;

means including a second antenna at a distance from said first antenna for receiving said emitted radio frequency signals in said space;

a gas discharge lamp in said space having gas discharge path of a length shorter than one quarter of the shortest wavelength in said range;

means connected to said gas discharge lamp for energizing said lamp with alternating current for emitting light in said space;

means for providing radio frequency signals within said wavelength range for transmission by said first antenna and reception by said second antenna; and means connected to said signal providing means and to said first antenna for transmitting said radio frequency signals via said first and second antennas and said space having said gas discharge lamp provided and energized therein.

26. Apparatus as claimed in claim 25 wherein:

said gas discharge lamp has a straight gas discharge path shorter than one quarter of the shortest wavelength in said range.

27. Apparatus as claimed in claim 25, wherein:

said gas discharge lamp has a circular shape of a circumference shorter than one quarter of the shortest wavelength in said range.

28. Apparatus as claimed in claim 25, including:

means for mounting said gas discharge lamp in a cross-polarized relationship to said first antenna in said space.

29. Apparatus as claimed in claim 25, including:

means for shielding said gas discharge lamp against said radio frequency signals transmitted by said first antenna in said space.

30. In apparatus for transmitting electromagnetic radiation in a space for illumination and communication, the improvement comprising in combination:

means including a first antenna for emitting radio frequency signals in said space;

means including a second antenna for receiving said emitted radio frequency signals;

a gas discharge lamp;

means for shielding said gas discharge lamp against said radio frequency signals transmitted by said first antenna in said space;

means for mounting said gas discharge lamp in a cross-polarized relationship to said first antenna in said space;

means connected to said gas discharge lamp for energizing said lamp with alternating current for emitting light in said space; and means connected to said first antenna for providing radio frequency signals and for transmitting said radio frequency signals via said first and second antennas and said space having said gas discharge lamp provided and energized therein.

31. Apparatus as claimed in claim 30, including:

means for mounting said first antenna in a first plane; and means for mounting said lamp in a second plane extending at right angles to said first plane.

32. Apparatus as claimed in claim 30, wherein:

said first antenna extends in a first plane;

said gas discharge lamp has a circular gas discharge path; and said circular gas discharge path extends in a second plane at right angles to said first plane.

33. Apparatus as claimed in claim 30, wherein:

said gas discharge lamp has a straight gas discharge path extending at right angles to said first antenna in said space.

34. In apparatus for transmitting electromagnetic radiation in a space for illumination and communication, the improvement comprising in combination:

means including a first antenna for emitting radio frequency signals in said space;

means including a second antenna for receiving said emitted radio frequency signals;

a gas discharge lamp in said space;

means for shielding said gas discharge lamp against said radio frequency signals emitted by said first antenna in said space;

means connected to said lamp for energizing said lamp with alternating current for emitting light in said space; and means connected to said first antenna for providing radio frequency signals and for transmitting said radio frequency signals via said first and second antennas and said space having said gas discharge lamp provided and energized therein.

35. In apparatus for transmitting electromagnetic radiation in a space for illumination and for communication of a signal having an alternating current component, the improvement comprising in combination:

means for modulating said signal on a radio frequency carrier;

means including a first antenna for emitting said modulated radio frequency carrier in said space;

means including a second antenna for receiving said emitted radio frequency carrier;

a gas discharge lamp in said space;

means for shielding said gas discharge lamp against said radio frequency signals transmitted by said first antenna;

means for providing an alternating current having a frequency above the highest useful frequency of said alternating current component and for energizing said lamp with said alternating current for emitting light in said space; and means connected to said modulating means and to said first antenna for transmitting said radio frequency signals via said first and second antennas and said space having said gas discharge lamp provided and energized therein.

36. Apparatus as claimed in claim 35, including:

means for mounting said gas discharge lamp in a cross-polarized relationship to said first antenna in said space.

37. In apparatus for transmitting electromagnetic radiation in a space for illumination and for communication of a signal having an alternating current component, the improvement comprising in combination:

means for providing radio frequency signals within a predetermined wavelength range including means for modulating said signal on a radio frequency carrier;

means including a first antenna for emitting said modulated radio frequency carrier in said space;

means including a second antenna for receiving said emitted radio frequency carrier;

a gas discharge lamp in said space, with a gas discharge in said lamp having a length shorter than one quarter of the shortest wavelength in said range;

means for providing an alternating current having a frequency above the highest useful frequency of said alternating current component and for energizing said lamp with said alternating current for emitting light in said space; and means connected to said modulating means and to said first antenna for transmitting said radio frequency signals via said first and second antennas and said space having said gas discharge lamp provided and energized therein.

38. In apparatus for transmitting electromagnetic radiation in a space for illumination and for communication of a signal, the improvement comprising in combination:

means for modulating said signal on a radio frequency carrier by frequency modulation;

means including a first antenna for emitting said modulated radio frequency carrier in said space;

means including a second antenna for receiving said emitted radio frequency carrier;

a gas discharge lamp in said space;

means connected to said lamp for energizing said lamp with alternating current for emitting light in said space, whereby an amplitude modulation is imposed on said emitted radio frequency carrier;

means connected to said modulating means and to said first antenna for transmitting said modulated radio frequency carrier via said first and second antennas and said space having said gas discharge lamp provided and energized therein; and means connected to said second antenna including a frequency modulation receiver for receiving and demodulating said transmitted radio frequency carrier to regain said signal therefrom, said frequency modulation receiver including amplitude modulation rejection means for rejecting said amplitude modulation.

39. Apparatus as claimed in claim 38, including:

means for mounting said gas discharge lamp in a cross-polarized relationship to said first antenna in said space.

40. Apparatus as claimed in claim 38, including:

means for shielding said gas discharge lamp against said radio frequency carrier transmitted by said first antenna.

41. In apparatus for transmitting electromagnetic radiation in a space for illumination and for communication of a signal, the improvement comprising in combination:

means for modulating said signal on a radio frequency carrier by frequency modulation;

means including a first antenna for emitting said modulated radio frequency carrier in said space;

means including a second antenna for receiving said emitted radio frequency carrier;

a gas discharge lamp in said space with a gas discharge in said lamp having a length shorter than one quarter of the wavelength of said radio frequency carrier;

means connected to said lamp for energizing said lamp with alternating current for emitting light in said space, whereby an amplitude modulation is imposed on said emitted radio frequency carrier;

means connected to said modulating means and to said first antenna for transmitting said modulated radio frequency carrier via said first and second antennas and said space having said gas discharge lamp provided and energized therein; and means connected to said second antenna including a frequency modulation receiver for receiving and demodulating said transmitted radio frequency carrier to regain said signal therefrom, said frequency modulation receiver including amplitude modulation rejection means for rejecting said amplitude modulation.

42. Apparatus as claimed in claim 38, wherein:

said modulating means include means for providing said signal within a predetermined frequency band; and said energizing means include means for energizing said lamp with a frequency higher than said frequency band.

43. Apparatus as claimed in claim 25, 30, 34, 35 and 38, wherein:

said first antenna is located at a first distance from said lamp; and said second antenna is located at a second distance from said first antenna, with said first distance being larger than said second distance.

44. Apparatus as claimed in claim 25, 30, 34, 35 and 38, wherein:

said first antenna is located at a first distance from said lamp; and said second antenna is located at a second distance from said first antenna and at a third distance from said lamp, with said first distance being larger than said second distance, and said second distance being smaller than the sum of said first and third distances.

45. Apparatus as claimed in claim 25, 30, 34, 35 and 38, wherein:

said first antenna is located at a first distance from said lamp; and said second antenna is located at a second distance from said first antenna and at a third distance from said lamp, with said first distance being larger than said second distance, and said third distance being larger than said first distance.

46. Apparatus as claimed in claims 25, 30, 34, 35 or 38, including:

means locating said first antenna at a first distance from said lamp; and means locating said second antenna at a second distance from said first antenna;

said first distance being larger than said second distance.

47. Apparatus as claimed in claim 46, wherein:

said second antenna is located at a third distance from said lamp, with said second distance being smaller than the sum of said first and third distances.

48. Apparatus as claimed in claim 46, wherein:

said second antenna is located at a third distance from said lamp, with said third distance being larger than said first distance.

* * * * *